United States Patent
Chen et al.

(10) Patent No.: US 9,013,549 B2
(45) Date of Patent: Apr. 21, 2015

(54) DEPTH MAP GENERATION FOR CONVERSION OF TWO-DIMENSIONAL IMAGE DATA INTO THREE-DIMENSIONAL IMAGE DATA

(75) Inventors: Yen-Yu Chen, New Taipei (TW); Ching-Chang Shih, Miao Li County (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 539 days.

(21) Appl. No.: 13/479,794

(22) Filed: May 24, 2012

(65) Prior Publication Data

US 2013/0314494 A1    Nov. 28, 2013

(51) Int. Cl.
*H04N 13/00* (2006.01)
*G06T 7/00* (2006.01)

(52) U.S. Cl.
CPC ..... *G06T 7/0071* (2013.01); *G06T 2207/10016* (2013.01)

(58) Field of Classification Search
USPC ............................ 348/43; 375/240.01–240.29
See application file for complete search history.

(56) References Cited

U.S. PATENT DOCUMENTS

| | | | |
|---|---|---|---|
| 5,510,857 A * | 4/1996 | Kopet et al. | 348/699 |
| 6,421,466 B1 * | 7/2002 | Lin | 382/236 |
| 2002/0012459 A1 * | 1/2002 | Oh | 382/154 |
| 2004/0223662 A1 * | 11/2004 | Urano et al. | 382/299 |
| 2011/0096832 A1 | 4/2011 | Zhang et al. | |
| 2011/0176027 A1 * | 7/2011 | Tanaka | 348/222.1 |
| 2011/0202277 A1 * | 8/2011 | Haddad | 702/7 |
| 2011/0221966 A1 * | 9/2011 | Hsieh et al. | 348/665 |
| 2012/0194642 A1 * | 8/2012 | Lie et al. | 348/43 |

* cited by examiner

*Primary Examiner* — Sath V Perungavoor
*Assistant Examiner* — Nathnael Aynalem
(74) *Attorney, Agent, or Firm* — Muncy, Geissler, Olds & Lowe, P.C.

(57) ABSTRACT

A method of depth map generation is disclosed. The method comprises the steps of: scaling down a video unit and a previous video unit to generate a reduced video unit and a reduced previous video unit; dividing the reduced video unit into N1 portions and a buffer into N2 storing units; performing a motion estimation for a target pixel of the reduced video unit to obtain a motion vector based on pixels in a preset search window established in the reduced previous video unit; assigning a depth value to the target pixel according to the motion vector; storing the target pixel in one of the N2 storing units sequentially; and, repeating the steps of performing, assigning and storing until all pixels of the reduced video unit are processed to obtain a motion depth map.

45 Claims, 15 Drawing Sheets image strip | 120 | 122 | 130 | 136 | 140 | 147 | 152 | 153 | 152 | 144 | 139 | 135 | 129 | 126 | 119 | . | .

first derivatives | 8 | 6 | 4 | 7 | 5 | 1 | -1 | -8 | -5 | -4 | -6 | -3 | -7

DEPTH MAP GENERATION FOR CONVERSION OF TWO-DIMENSIONAL IMAGE DATA INTO THREE-DIMENSIONAL IMAGE DATA

BACKGROUND OF THE INVENTION

1. Field of the Invention

The invention relates to a video system, particularly to a device and method of depth map generation for conversion of two-dimensional (2D) image data into three-dimensional (3D) image data.

2. Description of the Related Art

Human are pursuing the reality of vision devices. The video devices improve from monochrome to 3D LCD today. The video signals also vary in the video devices. Currently, since a stereoscopic 3D display has been commercialized and services associated with 3D contents, such as with 3D movies, have increased, users' desires for the same have increased. However, lack of 3D content prevents 3D display from being commercialized in the current market. In contrast, there exists a large amount of 2D contents in both commercial market and personal recording for which it may be desirable to convert into 3D video.

U.S. Publication. No. 2011/0096832 (by Zhang et al.) describes a depth map generation for conversion of 2D video data into 3D video data, computing motion for high motion pixels (hereinafter called "first analysis") based on a frame c and a previous frame c−1 and extracting color components for low motion pixels (hereinafter called "second analysis") based on the frame c. Referring to FIG. 5 of Zhang, for any low motion pixels, the depth values generated based on motion may be replaced with depth values determined from pixel color components. One problem with the Zhang's method is that a lot of storage space is required to temporarily store the frame c and the previous frame c−1 for first analysis. Another problem is that color components of the frame c are required for second analysis, therefore increasing depth estimation computational complexity.

Accordingly, what is needed is a method and apparatus to address the above-identified problems. The invention addresses such a need.

SUMMARY OF THE INVENTION

One objective of the invention is to provide a depth map generation method that can solve the above problems in the prior art.

One embodiment of the invention provides a method for generating a depth map. The method comprises: scaling down a video unit c and a previous video unit c−1 to generate a reduced video unit c and a reduced previous video unit c−1; dividing the reduced video unit c into N1 portions and a buffer into N2 storing units respectively: performing a motion estimation for a target pixel of the reduced video unit c to obtain a motion vector based on pixels in a preset search window established in the reduced previous video unit c−1; assigning a depth value to the target pixel according to the motion vector; storing the target pixel in one of the N2 storing units sequentially, wherein the rest of the N2 storing units store at least one portion of the reduced previous video unit c−1; and, repeating the steps of performing, assigning and storing until all pixels of the reduced video unit c are processed to obtain a motion depth map m_map; wherein N1 is less than N2.

Another embodiment of the invention provides a device for generating a depth map. The device comprises: means for scaling down a video unit c and a previous video unit c−1 to generate a reduced video unit c and a reduced previous video unit c−1; means for dividing the reduced video unit c into N1 portions and a buffer into N2 storing units respectively; means for performing a motion estimation for a target pixel of the reduced video unit c to obtain a motion vector based on pixels in a preset search window established in the reduced previous video unit c−1; means for assigning a depth value to the target pixel according to the motion vector; means for storing the target pixel in one of the N2 storing units sequentially, wherein the rest of the N2 storing units store at least one portion of the reduced previous video unit c−1; and, means for repeating the steps of performing, assigning and storing until all pixels of the reduced video unit c are processed to obtain a motion depth map m_map; wherein N1 is less than N2.

Another embodiment of the invention provides a method for generating a depth map. The method comprises: scaling down a video unit c to generate a reduced video unit c: when a complexity resolution is the lowest, dividing the reduced video unit c into a first number of pixel blocks according to a number of points to be transformed in one pixel block; when the complexity resolution is other than the lowest, forming a second number of pixel blocks according to both image data and a size of the reduced video unit c, the number of points to be transformed and a size of the second number of pixel blocks; sequentially transforming the pixel blocks into a plurality of frequency blocks; multiplying each of the frequency blocks by a weight matrix to obtain a product matrix, wherein a plurality of elements in the weight matrix corresponding to mediate-high-frequency components are given more weights than the other elements; and, obtaining a depth value according to each of the product matrix to generate a complexity depth map; wherein the first number is less than the second number.

Another embodiment of the invention provides a device for generating a depth map. The device comprises: means for scaling down a video unit c to generate a reduced video unit c; means for dividing the reduced video unit c into a first number of pixel blocks according to a number of points to be transformed in one pixel block when a complexity resolution is the lowest; means for forming a second number of pixel blocks according to image data of the reduced video unit c, the number of points to be transformed, a size of the reduced video unit c and a size of the second number of pixel blocks when the complexity resolution is other than the lowest; means for sequentially transforming the pixel blocks into a plurality of frequency blocks; means for multiplying each of the frequency blocks by a weight matrix to obtain a product matrix, wherein a plurality of elements in the weight matrix corresponding to mediate-high-frequency components are given more weights than the other elements; and, means for obtaining a depth value according to each of the product matrix to generate a complexity depth map; wherein the first number is less than the second number.

Another embodiment of the invention provides a method for generating a depth map. The method comprises: dividing a video unit c into a plurality of accumulation blocks; computing first derivatives fd of luminance values with respect to a first direction for all pixels in the video unit c; along the first direction, accumulating a number Np of the pixels whose first derivatives fd continuously stay in a pre-defined range to obtain a sum for each accumulation block, wherein $th2 \leq Np \leq th1$; and, obtaining a luminance-variation depth map according to the sum for each accumulation block.

Another embodiment of the invention provides a device for generating a depth map. The device comprises: means for means for dividing a video unit c into a plurality of accumulation blocks; means for computing first derivatives fd of luminance values with respect to a direction for all pixels in the video unit c; means for accumulating a number Np of the pixels whose first derivatives fd continuously stay in a predefined range to obtain a sum for each accumulation block along the direction, wherein th2≤Np≤th1; and, means for obtaining a luminance-variation depth map according to the sum for each accumulation block.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 7 shows a relation of an exemplary pixel line and its first derivatives.

DETAILED DESCRIPTION OF THE INVENTION

The techniques described in this disclosure may be implemented in hardware, software, firmware, or a combination of thereof. An example of a pure solution would be an FPGA or ASIC design. An example of a hardware and software implementation would be a DSP and embedded firmware.

Throughout the specification and claims, the term "depth map" is defined herein to refer to a two-dimensional matrix of depth values, in which each depth value corresponds to a respective location in a scene and indicates the distance from a certain reference location to the respective scene location. A 2D image may be displayed using 3D technology if each pixel in the 2D image has a respective depth value. For example, if a 2D image has a resolution of W×H pixels, its depth map may include W×H corresponding depth values.

This disclosure describes techniques for generating depth maps for video units, such as video frames, slices of video frames, or other portions of video frames. Hereinafter, video frames are utilized as embodiments and not limitations of the invention.

Figure 1A:
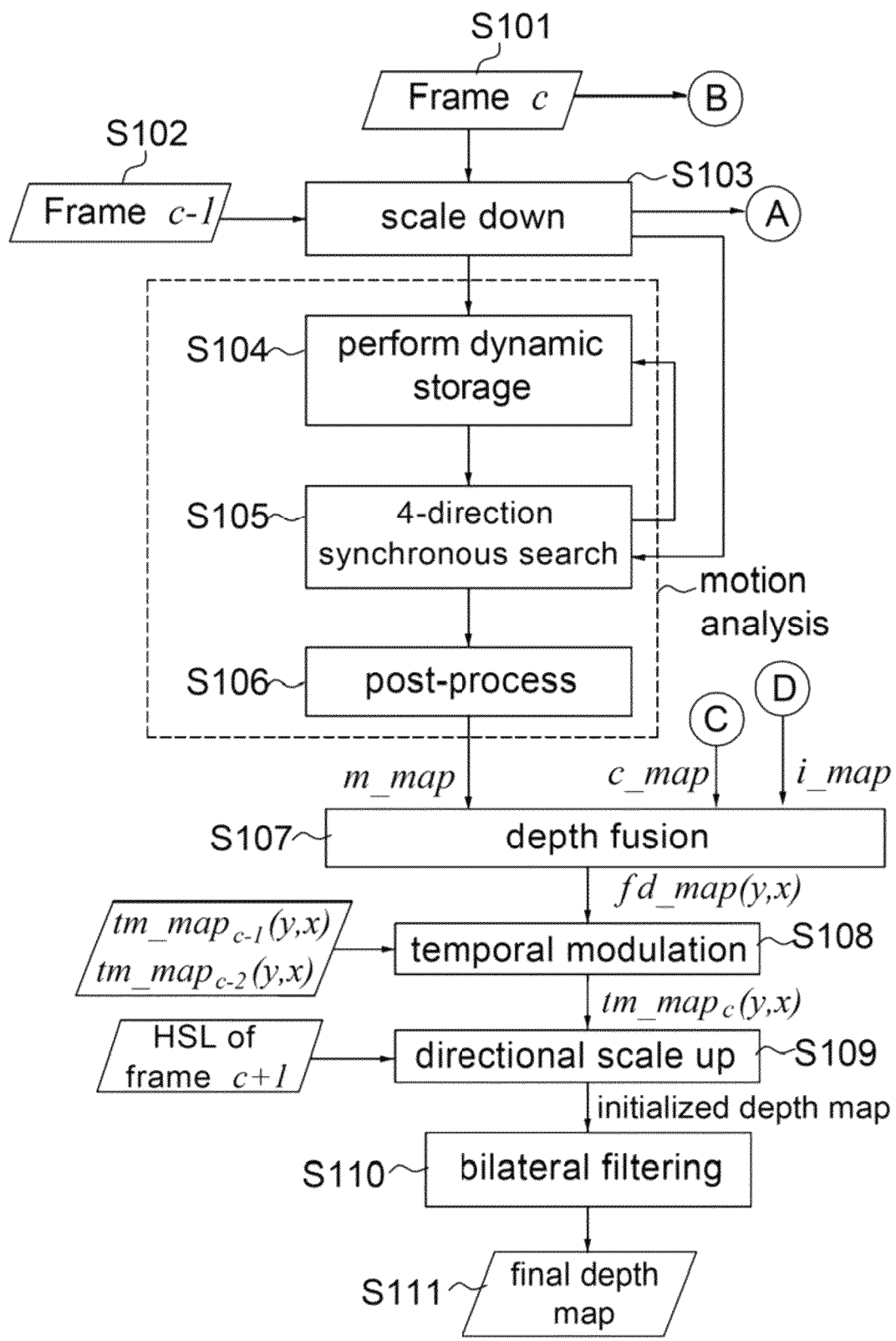
FIGS. 1A-1B describe a flow chart illustrating a method of generating a depth map according to an embodiment of the invention.
Figure 1B:
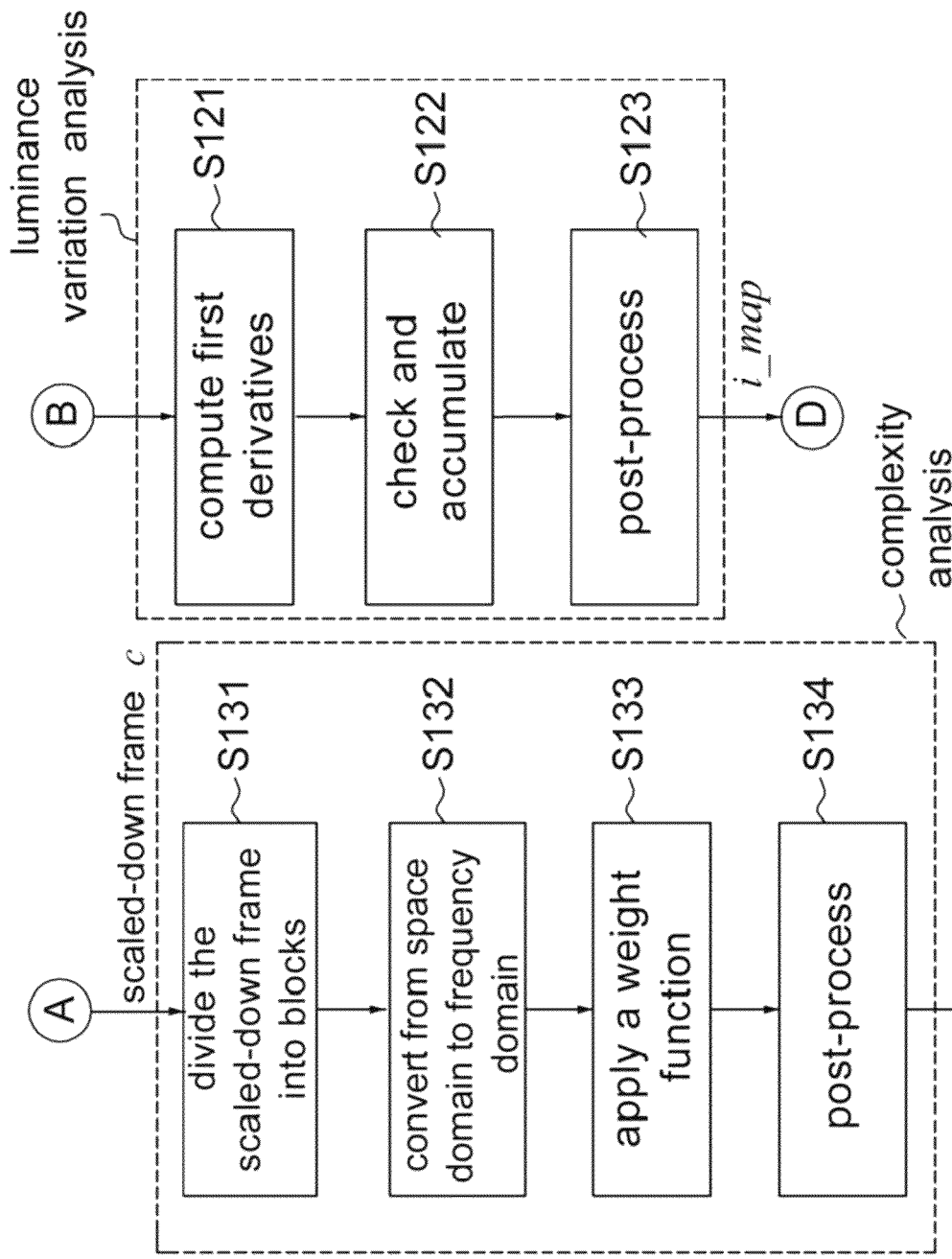

FIGS. 1A-1B describe a flow chart illustrating a depth map generation method according to an embodiment of the invention. The process of FIGS. 1A-1B could be applied in, but not limited to a 3D display system. The invention includes a motion analysis and a static analysis. In one embodiment, the static analysis includes a complexity analysis and a luminance variation analysis.

Figure 2A:
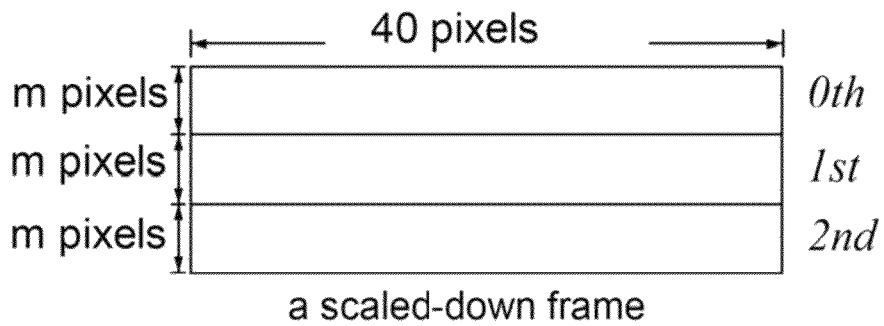
FIG. 2A is an example showing a scaled-down image is divided into three portions (i.e., 0th, 1st, 2nd).
Figure 2B:
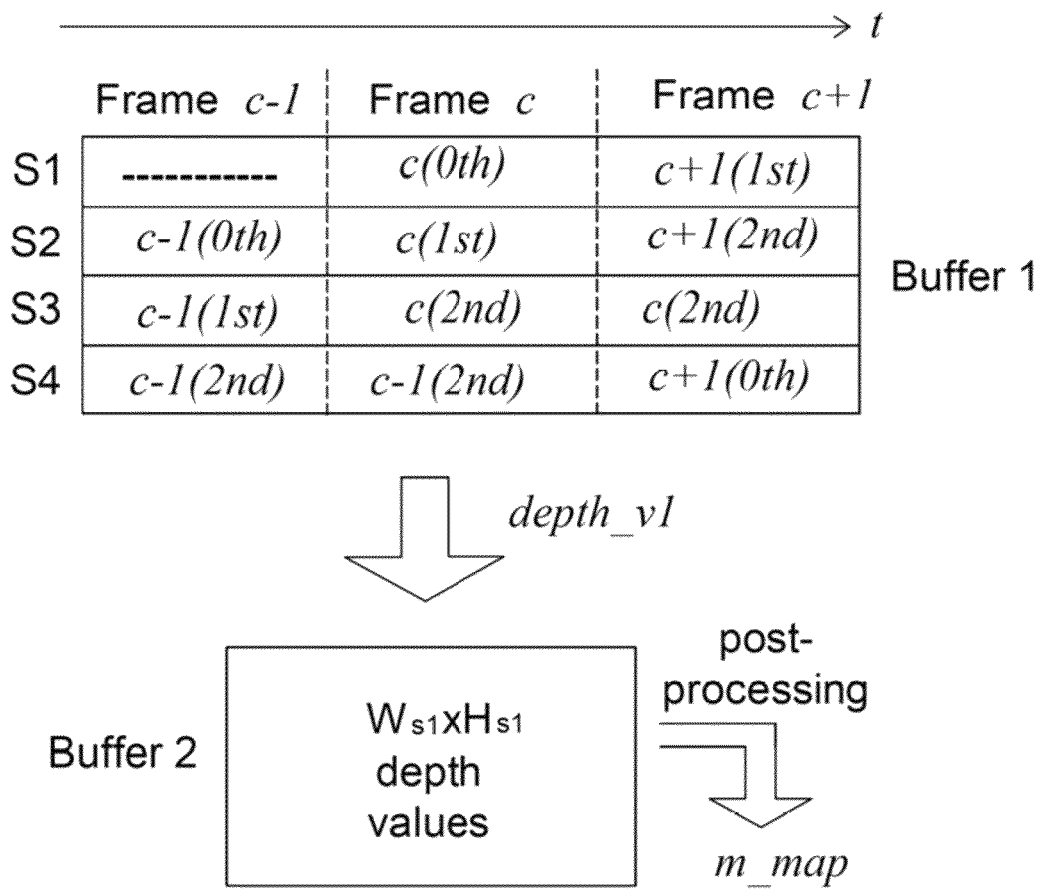
FIG. 2B shows a buffer having four storing units perform a dynamic storage.

The embodiment begins with providing image data of frames c and c−1 (steps 101 and 102), where the parameter c is a positive integer. Then, the frames c and c−1 captured at a display resolution of W×H pixels are scaled down to $W_{S1} \times H_{S1}$ by a scaler (not shown) for motion analysis (step 103). A preset search window has a size of ((2×m)−1)×((2×m)−1), where the parameter m is related to a buffer size. Hereinafter, assume that W=1920, H=1080, $W_{S1}$=40, $H_{S1}$=24, and m=8 in one embodiment. As shown in FIG. 2A, each scaled-down image is divided into N1(=$H_{S1}$/m=24/8=3) portions (i.e., 0th, 1st, 2nd), each portion having a size of $W_{S1} \times m$ pixels. A buffer (e.g., buffer 1) that saves the scaled-down images is equally divided into N2(=four) storing units S1-S4 as shown in FIG. 2B. The size of each storing unit (S1-S4) is large enough to store anyone of the three portions (0th, 1st, 2nd) and the number N2 of the storing units is greater than the number N1 of the portions.

Referring to FIG. 2B, before the scaled-down frame c is fed to buffer 1 for motion analysis, all scaled-down image data (c−1(0th), c−1(1st) and c−1(2nd)) of the frame c−1 is already saved in storing units S2-S4 of buffer 1 (step 104). In step 105, motion estimation, especially a four-direction (top/bottom/right/left) synchronous search, is performed according to the luminance values of pixels in c(0th) and the scaled-down frame c−1 on a pixel-by-pixel basis to obtain a motion vector for each pixel in the first portion c(0th) of the scaled-down frame c. For example, a luminance value of a target pixel in c(0th) is compared with the luminance values of pixels in a preset search window (whose size is ((2×m)−1)×((2×m)−1) =15×15, m=8, as mentioned above) established in c−1(0th) of the scaled-down frame c−1 on a pixel-by-pixel basis to obtain a pixel-based motion vector with a minimum absolute difference. According to the invention, the target pixel and the center of the preset search window respectively have the same coordinate in the scaled-down frame c and c−1. The motion vector is then used to assign a depth value depth_v1 to the target pixel and correspondingly the depth value depth_v1 is saved in buffer 2. Meanwhile, the luminance value of the target pixel in c(0th) overwrites old data saved in S1 of buffer 1. Afterward, performing the four-direction synchronous search, assigning the depth value to a target pixel and saving its luminance value repeat until the depth values depth_v1 related to all pixels in c(0th) are obtained and saved in buffer 2 and the luminance values of all pixels in c(0th) are saved in S1 of buffer 1. According to the invention, the pixels of c(0th) are allowed to be saved in a storing unit that stores either non-immediately-previous-frame image data or already processed image data. Here, the preset search window size (((2×m)−1)×((2×m)−1)) is related to the heights of the three portions in FIG. 2A.

Then, a second portion (denoted by c(1st)) of the scaled-down frame c is provided. Likewise, while the four-direction synchronous search is performed, a luminance value of a target pixel in c(1st) is compared with the luminance values of pixels in the preset search window established in c−1(1st) of the scaled-down frame c−1 on a pixel-by-pixel basis to obtain a pixel-based motion vector with a minimum absolute difference. Steps 104 and 105 repeat until the depth values depth_v1 related to all pixels in c(1st) are saved in buffer 2 and the luminance values of all pixels in c(1st) overwrite the luminance values of c−1(0th) and are saved in S2 of buffer 1. Here, since the image data of c−1(0th) have already been processed, the luminance values of all pixels in c(1st) are allowed to be saved in S2 of buffer 1.

Finally, a third portion (denoted by c(2nd)) of the scaled-down frame c is provided. In the same manner, while the four-direction synchronous search is performed, a luminance value of a target pixel in c(2nd) is compared with the luminance values of pixels in the preset search window established in c−1(2nd) of the scaled-down frame c−1 on a pixel-by-pixel basis to obtain a pixel-based motion vector with a minimum absolute difference. Steps 104 and 105 repeat until the depth values depth_v1 related to all pixels in c(2nd) are obtained and saved in buffer 2 and the luminance values of all pixels in c(2nd) are saved in S3 of buffer 1. Here, since the image data of c−1(1st) have already been processed, the luminance values of all pixels in c(2nd) are allowed to be saved in S3 of buffer 1.

Next, a total of $W_1 \times H_1$ depth values depth_v1 in buffer 2 may be post processed (step 106) to produce a motion depth map m_map including more spatially consistent depth values. For example, post processing may include filtering or other types of processing to ensure that depth values are spatially consistent.

A feature of the invention is to perform a dynamic storage to save storage space. As can be observed from above, it is not necessary for the 3D display system to save the whole image data of the scaled-down frames c and c−1. The invention will work if the capacity of the storing units is large enough to accommodate the whole image data of the scaled-down frame c−1 and at least one portion of the scaled-down frame c, achieving maximum possible functionality with limited storage space.

In case an image with an object boundary has dramatic luminance variations, it is characterized by high-frequency content. In case a monotonic image has slight luminance variations, it is characterized by little high-frequency content. In case an image is with good complexity and definition, it is characterized by mediate-high-frequency content. Thus, another feature of the invention is to perform a conversion from spatial domain to frequency domain for complexity analysis to distinguish the complexity and the definition of an image by mediate-high-frequency content.

In the following, a complexity analysis is described. First, the frame c originally captured at a display resolution of W×H pixels is scaled down to $W_{S2} \times H_{S2}$ for complexity analysis in step 103 and the scaled-down frame c contains luminance data only.

Depending on the number of points in a block to be converted (from spatial domain to frequency domain), the above scaled-down frame c ($W_{S2} \times H_{S2}$) is divided into a plurality of blocks in step 131. In addition, depending on what complexity resolution it is, the number of blocks is enlarged correspondingly. Please be noted that the complexity analysis can not be performed without outlining the profiles of objects or persons of the above scaled-down frame c. Generally, the higher the complexity resolution (under the upper limit of the complexity resolution), the more the number of blocks is enlarged and the more the profiles of objects or persons are outlined. In a case the complexity analysis is performed over the upper limit of the complexity resolution, only local characteristics are distinguished instead of outlining the profiles of objects or persons. In step 131, the invention imposes an upper limit and a lower limit on complexity resolution so that the profiles of objects or persons of the above scaled-down frame c is able to be outlined. However, an upper limit and a lower limit of the complexity resolution vary according to image contents.

Hereinafter, assume that W=1920, H=1080, $W_{S2}$=160, $H_{S2}$=96 and k=8 in one embodiment. In this embodiment, k×k-point fast Fourier Transforms (FFT) are to be performed and the complexity resolution is the lowest (the number of pixel blocks is not enlarged), capable of outlining the profiles of objects or persons of the above scaled-down frame c. In step 131, the above scaled-down frame c (160×96) is divided into 20×12 pixel blocks n(y, x) as shown in the left figure of FIG. 3, where n(y, x) denotes a k×k matrix (i.e., 8×8 matrix), x=1-20 and y=1-12. In step 132, the 20×12 pixel blocks n(y, x) are subjected to a Transformation, such as a Fast Fourier Transformation (FFT) or a discrete cosine transform (DCT), and thus the frequency responses of the 20×12 pixel blocks n(y, x) are obtained. In this embodiment, the FFTs of the 20×12 pixel blocks n(y, x) are sequentially computed to thereby obtain 20×12 frequency-response matrixes Fm(y, x) (i.e., 8×8 matrix) and the elements contained in each matrix Fm(y, x) are complex numbers. Each matrix Fm(y, x) includes a DC component, low-frequency components, intermediate-frequency components and high-frequency components as shown in the right figure of FIG. 3. Spatial frequencies increase from left to right (horizontally) or from top to bottom (vertically). In order to distinguish the complexity and the definition of the above scaled-down frame c, the mediate-high-frequency components associated with each matrix Fm(y, x) will be given more weights in step 133. In other words, low and relatively high frequency components associated with each matrix Fm(y, x) are attenuated or disregarded in step 133. In this specification, the term "mediate-high-frequency components" refers to lower-frequency components in the high-frequency category and all components in the intermediate-frequency category as shown in the right figure of FIG. 3.

In step 133, an amplitude matrix Am(y, x) is given by:

$$Am(y, x) = \begin{bmatrix} a_{11} & a_{12} & \cdots & a_{1k} \\ a_{21} & a_{22} & \cdots & a_{2k} \\ \vdots & & & \vdots \\ a_{k1} & a_{k2} & \cdots & a_{kk} \end{bmatrix} = \text{amplitude of } Fm(y, x),$$

where $x = 1\text{-}20$, $y = 1\text{-}12$, and $k = 8$.

A weighting function is performed as follows:

$$Qm(y, x) = \begin{bmatrix} 0 & q_{12} & \cdots & q_{1k} \\ q_{21} & q_{22} & \cdots & q_{2k} \\ \vdots & & & \vdots \\ q_{k1} & q_{k2} & \cdots & q_{kk} \end{bmatrix} =$$

$$Wm \cdot Am(y, x) = \begin{bmatrix} 0 & w_{12} & \ldots & w_{1k} \\ w_{21} & w_{22} & \ldots & w_{2k} \\ \vdots & & & \vdots \\ w_{k1} & w_{k2} & \ldots & w_{kk} \end{bmatrix} \cdot \begin{bmatrix} a_{11} & a_{12} & \ldots & a_{1k} \\ a_{21} & a_{22} & \ldots & a_{2k} \\ \vdots & & & \vdots \\ a_{k1} & a_{k2} & \ldots & a_{kk} \end{bmatrix}$$

Wm denotes a weight matrix including k×k weight factors. All the weight factors in Wm keep unchanged. As mentioned above, regarding Wm, the weight factors associated with the mediate high frequency components are larger than the other weight factors associated with the low and relatively high frequency components to distinguish the complexity and the definition of the above scaled-down frame c. Therefore, the weight factor w11 denoting a DC component is set to 0 and accordingly the element $q_{11}$ equal to zero is obtained. Then, the depth value d(y,x) is calculated as follows:

$$d(y, x) = \frac{(0 + q_{12} + q_{13} + \ldots + q_{kk})}{qc1}, \text{ and } 0 <= d(y, x) <= 255$$

Here, the value qc1 is obtained by multiplying the sum of all the elements of a product matrix Qm(y, x) by a pre-defined ratio. The depth value d(y,x) is then saved in buffer 2. Like step 106, a total of 20×12 depth values (d(1,1)-d(12,20)) in buffer 2 are post-processed in step 134 to have more spatially consistent depth values. In order to perform depth fusion in step 107, all the depth maps (m_map-i_map) must be normalized in advance to the same reference, e.g., 40×24 depth values in this embodiment. In step 134, the 20×12 post-processed depth values are additionally interpolated up to 40×24 depth values to form a complexity depth map c_map for normalization purpose. Please be noted that if the output of step 133 already has the same reference level (i.e., includes 40×24 depth values), it is not necessary to perform interpolation in step 134.

Figure 3:
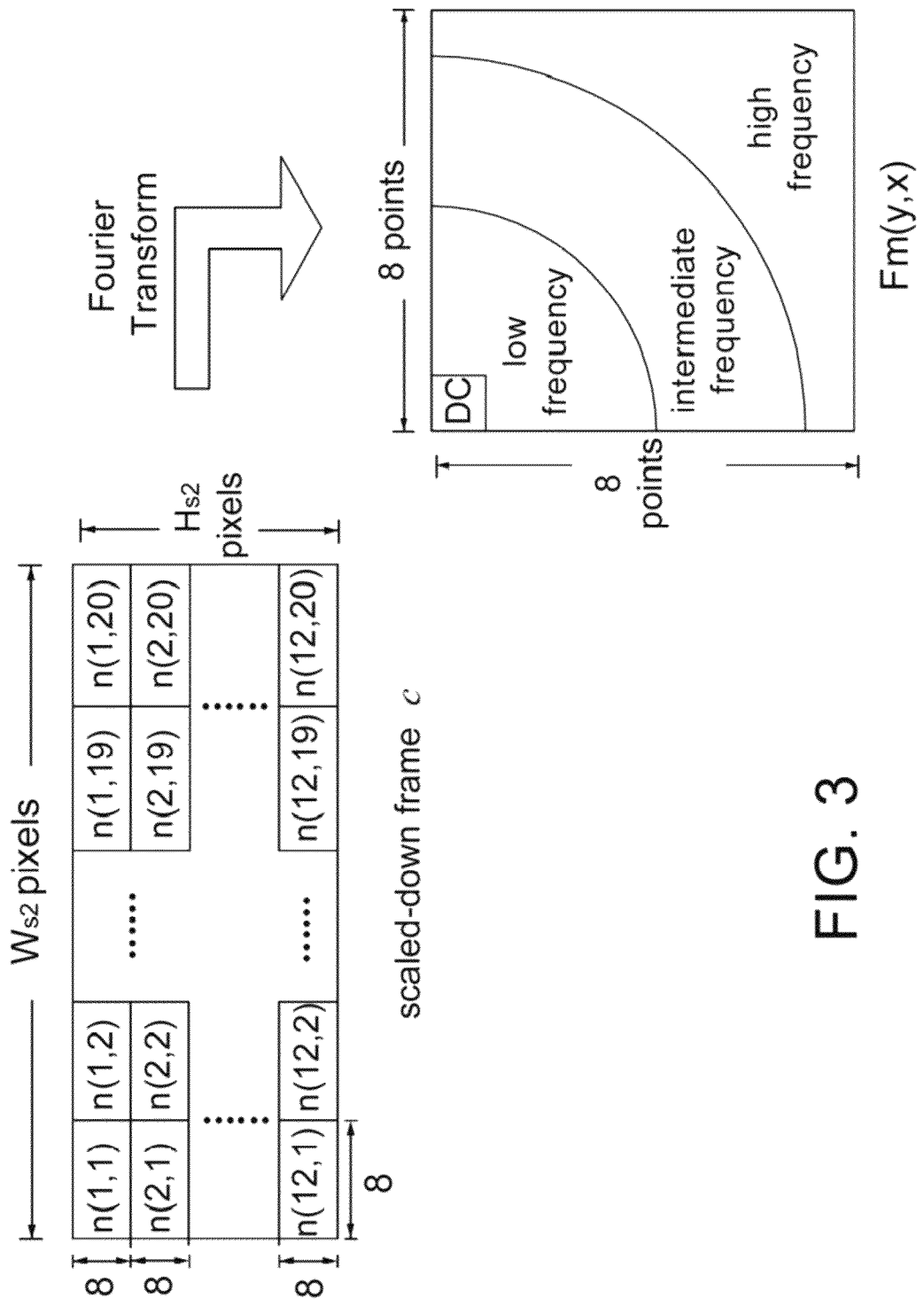
FIG. 3 shows a scaled-down frame has a plurality of blocks n(y,x), each of which is converted into a frequency-response matrix Fm(y,x).
Figure 4A:
FIG. 4A shows an original image of 640×480 with a horizontal cut line A-A.
Figure 4B:
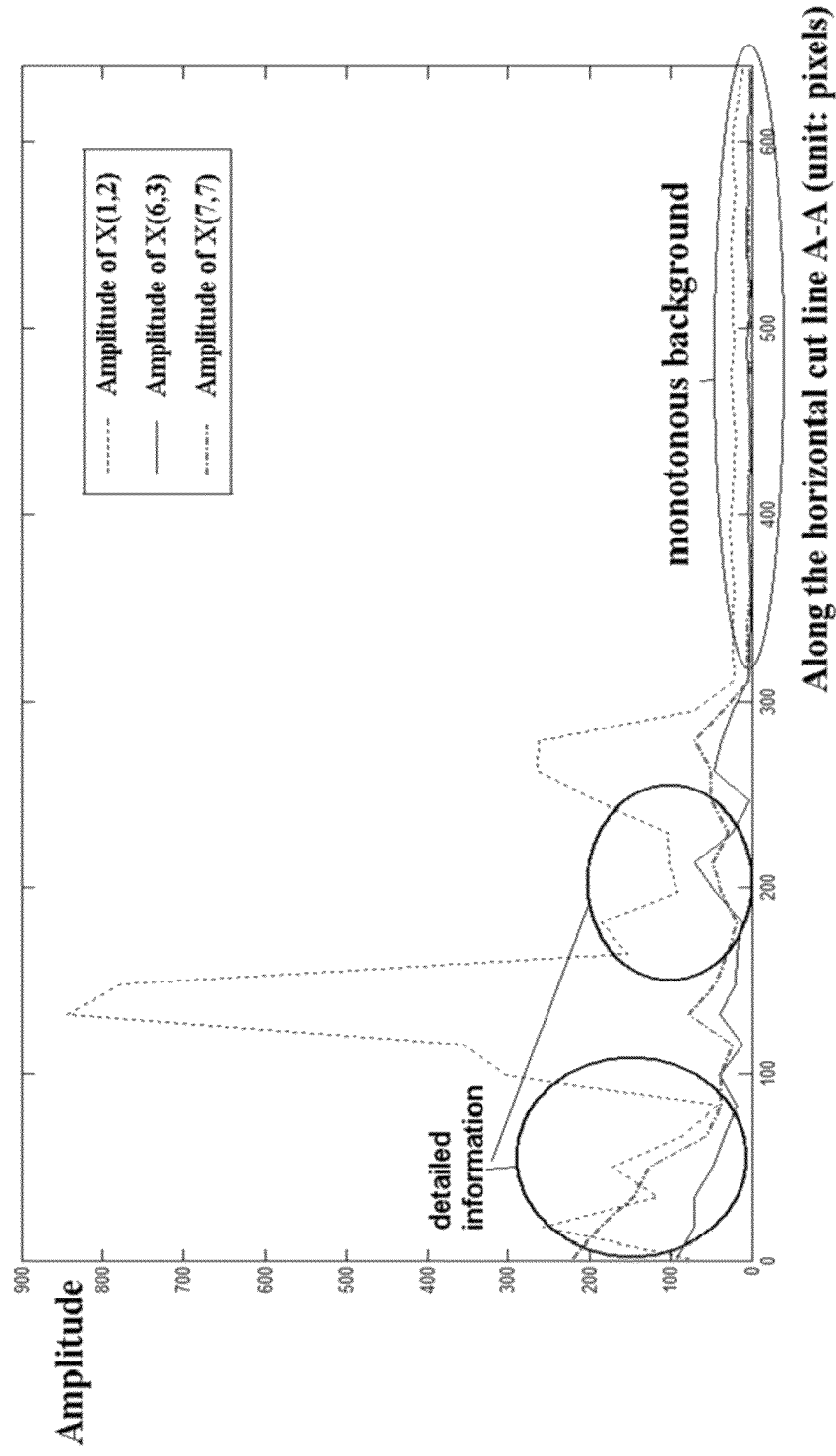
FIG. 4B shows amplitude curves of X(1,2), X(6,3) and X(7,7) after two-dimensional 8×8-point FFTs are computed along the horizontal cut line A-A of FIG. 4A.

FIG. 4A shows an original image of 640×480 with a horizontal cut line A-A. FIG. 4B shows amplitude curves of X(1,2), X(6,3) and X(7,7) after two-dimensional 8×8-point FFTs are computed (step 132) along the horizontal cut line A-A of FIG. 4A. For simplicity purpose, three (X(1,2), X(6,3) and X(7,7)) out of 64 amplitude curves are shown in FIG. 4B. Referring to the right figure of FIG. 3, the amplitude curve X(1,2) belongs in a low-frequency category, the amplitude curve X(6,3) belongs in a intermediate-high-frequency category and the amplitude curve X(7,7) belongs in a high-frequency category. As can be observed in FIG. 4B, the significant peaks show their proximity to object boundaries while small amplitudes show monotonous backgrounds. The amplitudes in the mediate high frequency range contain detailed information of the image in FIG. 4A. Since the high-frequency amplitude curve X(7,7) has maximal amplitudes near the object boundaries, it should be attenuated or disregarded.

Figure 5A:
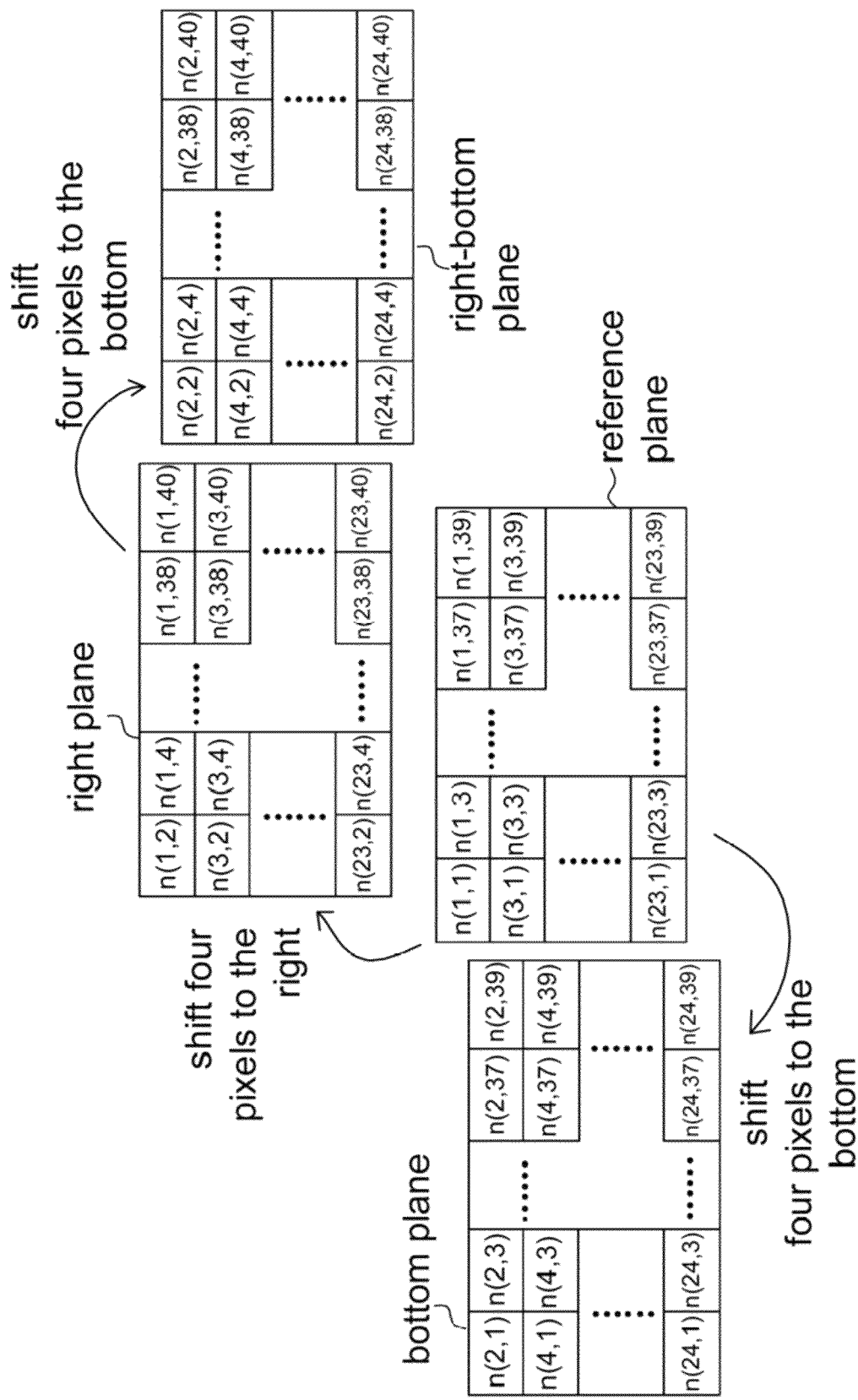
FIG. 5A shows a relationship of a reference plane, a right plane, a bottom plane and a right-bottom plane.

In an alternative embodiment, 8×8-point (k=8) fast Fourier Transforms (FFT) are performed and a total of 40×24 pixel blocks n(y, x) are outputted in step 131, where n(y, x) denotes an 8×8 matrix, x=1-40 and y=1-24. In this case, assume the profiles of objects or persons of the above scaled-down frame c are able to be outlined. The number of pixel blocks n(y, x) in FIG. 5A is four times larger than those in FIG. 3 and thus the complexity resolution is relatively satisfactory. Correspondingly, more profiles of objects or persons of the above scaled-down frame c are allowed to be outlined in FIG. 5A in comparison with FIG. 3.

Figure 5B:
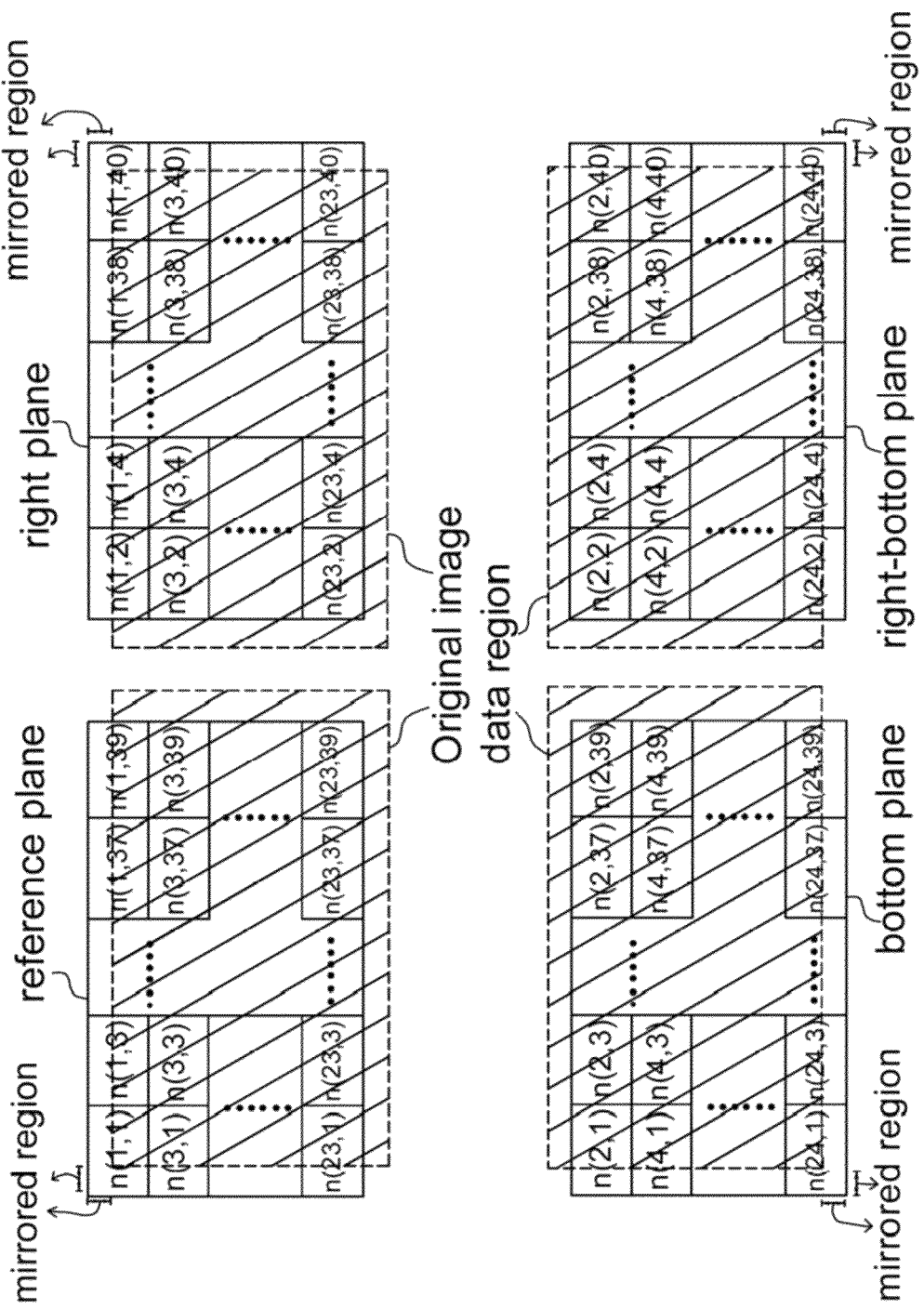
FIG. 5B shows a relation between original image data and the four planes of FIG. 5A.
Figure 5C:
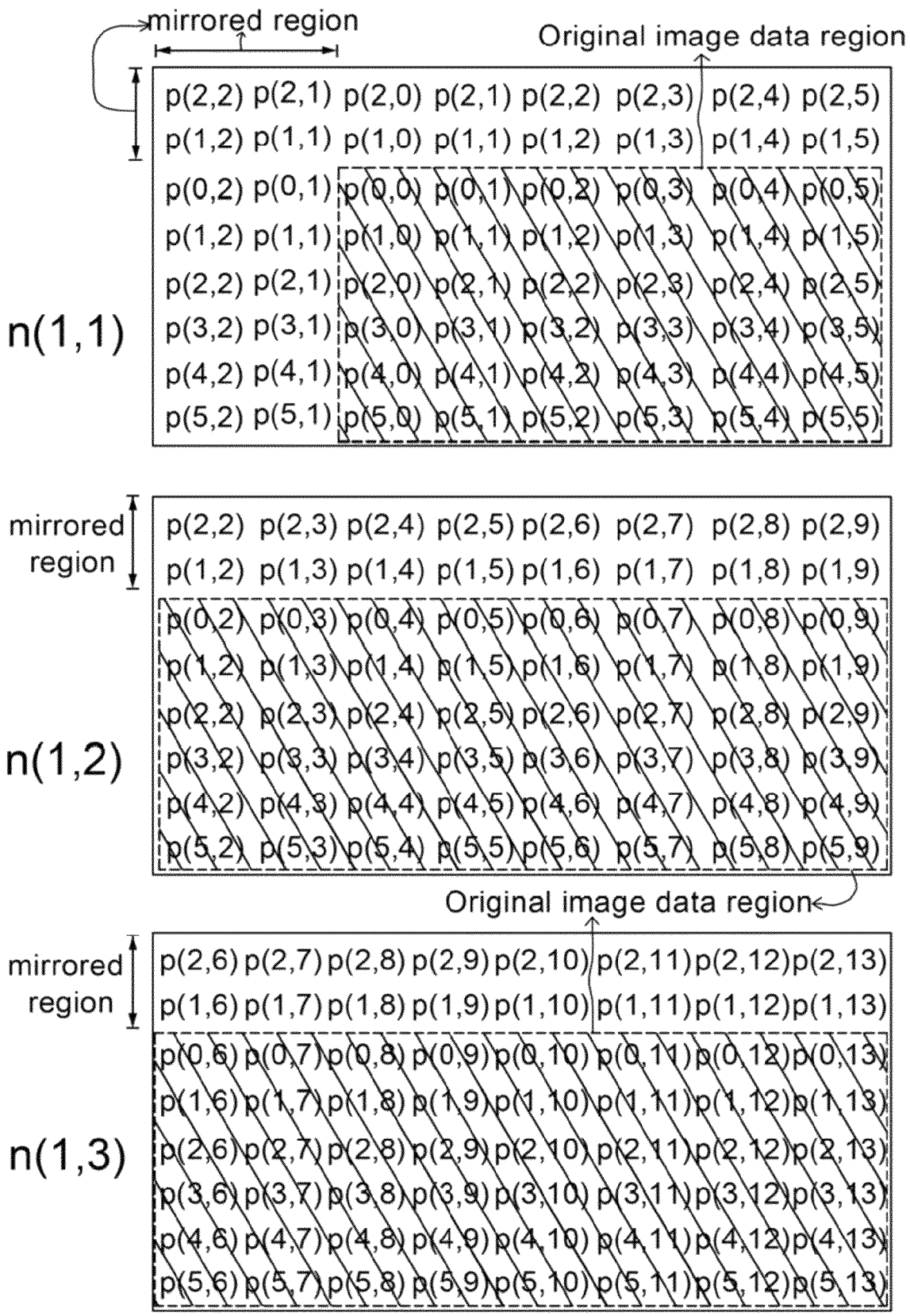
FIGS. 5C and 5D show each block includes at least one of a mirrored region and an original image data region.
Figure 5D:
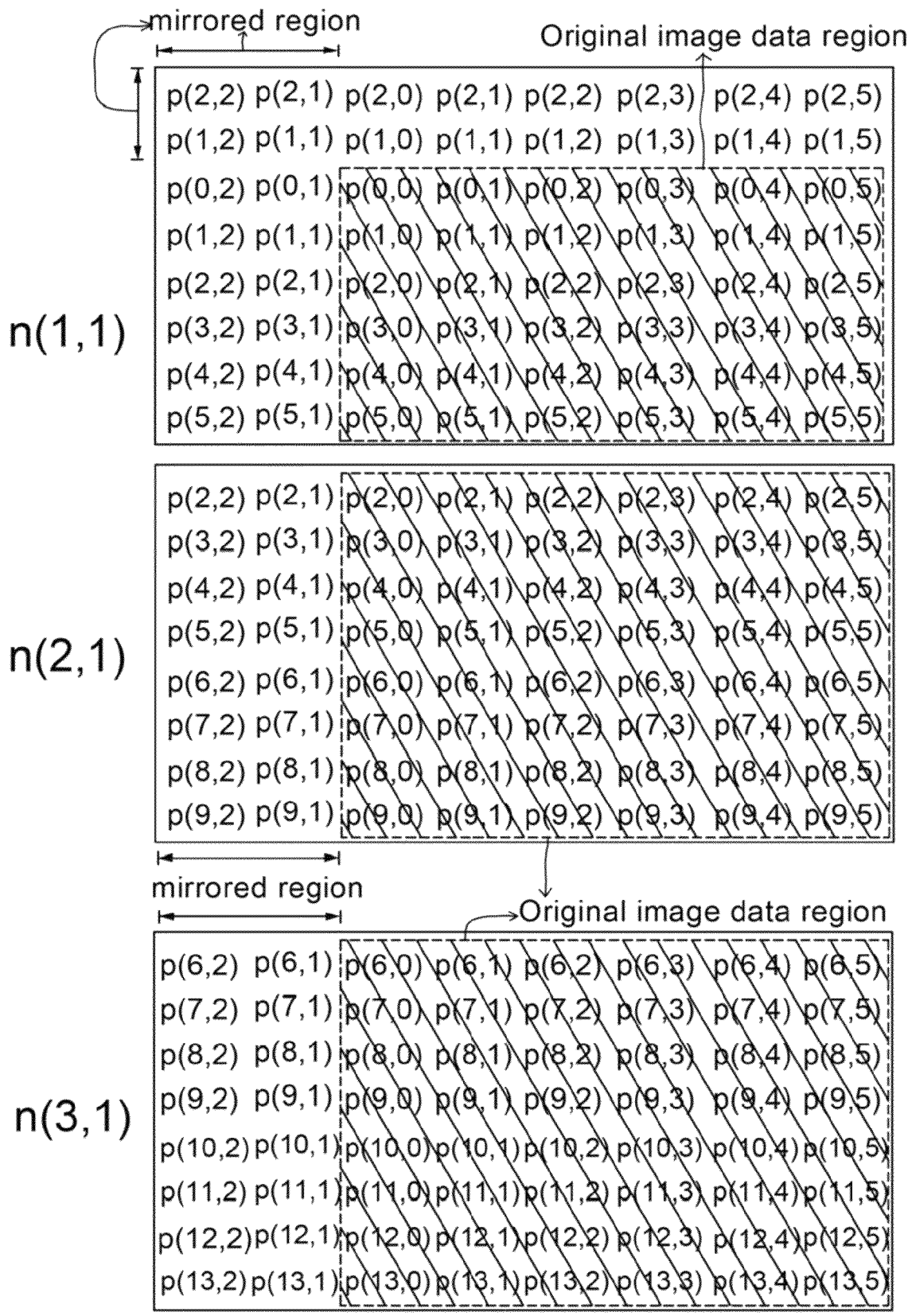

Referring to FIG. 5A, based on 8×8-point FFTs, the 40×24 pixel blocks n(y, x) are divided into a reference plane, a right plane, a bottom plane and a right-bottom plane, each having 20×12 pixel blocks n(y, x). FIG. 5A shows a relationship of a reference plane, a right plane, a bottom plane and a right-bottom plane. FIG. 5B shows a relation between original image data and the four planes of FIG. 5A. FIGS. 5C and 5D show each block includes at least one of a mirrored region and an original image data region. In FIGS. 5C and 5D, p(i, j) denotes an illuminance value at the coordinate (i, j) of the scaled-down frame c, where the parameter i is defined as a row index and j is defined as a column index.

In the above embodiment, W=1920, H=1080, $W_{S2}$=160, $H_{S2}$=96 and k=8. Horizontally, the above scaled-down frame c has a width of $W_{S2}$ (160 pixels) and the 40×24 pixel blocks n(y,x) have a width of m2h (40 columns of pixel blocks). The horizontal scale factor Wdn by which the number of pixel blocks is horizontally enlarged is calculated based on k×k-point FFT: Wdn=m2h/($W_{S2}$/k)=40/(160/8)=2. A horizontal shift spacing Wds is expressed in pixels: Wds=$W_{S2}$/m2h=160/40=4. The number nmp of mirrored pixel columns in the left mirrored region of the reference plane and in the right mirrored regions of the right plane is calculated by: nmp=(0.5×k)−(0.5×Wds)=4−2=2. Referring to FIGS. 5A-5D, compared to the reference plane, the right plane is shifted four pixels to the right. In the same manner, compared to the bottom plane, the right-bottom plane is shifted four pixels to the right.

For purposes of clarity and ease of description, only the horizontal formation of the reference plane and the right plane is described hereinafter from left side to right side. Specifically, mirrored pixels are located at the two left-most columns (within the left mirrored region) of the reference plane. The left mirrored region and the leftmost six-column pixels of the original image data (of the above scaled-down frame c) form the left-most column of pixel blocks (i.e., n(1,1), n(3,1), . . . , n(23,1)) in the reference plane as shown in FIGS. 5B and 5D. Then, based on the horizontal shift spacing Wds=4, by skipping the left mirrored region (two-column pixels) and the leftmost two-column pixels (p(i, j), j=0,1) of the original image data, the following eight-column pixels (p(i, j), j=2-9) of the original image data form the left-most column of pixel blocks (i.e., n(1,2), n(3,2), . . . , n(23,2)) in the right plane. Next, by skipping the following four-column pixels (p(i, j), j=2-5) of the original image data, the following eight-column pixels (p(i, j), j=6-13) of the original image data form the second left-most column of pixel blocks (i.e., n(1,3), n(3,3), . . . , n(23,3)) in the reference plane. In this manner, by repeating skipping four-column pixels (the horizontal shift spacing Wds=4) in x-axis each time, the reference plane and the right plane are constructed horizontally. Symmetrically, the right mirrored region and the rightmost six-column pixels of the original image data (of the above scaled-down frame c) form the right-most column of pixel blocks (i.e., n(1,40), n(3,40), . . . , n(23,40)) in the right plane. Likewise, the horizontal formation of the bottom plane and the right-bottom plane is similar to the horizontal formation of the reference plane and the right plane except that the bottom plane and the right-bottom plane are shifted four pixels to the bottom.

Vertically, the above scaled-down frame c has a height of $H_{S2}$ (96 pixels) and the 40×24 pixel blocks n(y, x) have a height of m2v (24 rows of pixel blocks). The vertical scale factor (Hn) by which the number of pixel blocks is vertically enlarged is calculated based on 8×8-point FFT: Hn=m2v/($H_{S2}$/k)=24/(96/8)=2. A vertical shift spacing Hs is expressed in pixels: Hs=$H_{S2}$/m2v=96/24=4. The number nmp of mirrored rows in the top mirrored region of the reference plane and in the bottom mirrored regions of the bottom plane is calculated by: nmp=(0.5×k)−(0.5×Hs)=4−2=2. Referring to FIGS. 5A-5D, compared to the reference plane, the bottom plane is shifted four pixels to the bottom. In the same manner, compared to the right plane, the right-bottom plane is shifted four pixels to the bottom.

For purposes of clarity and ease of description, only the vertical formation of the reference plane and the bottom plane is described hereinafter from top to bottom. Specifically, mirrored pixels are located at the two topmost rows (within the top mirrored region) of the reference plane. The top mirrored region and the topmost six-row pixels of the original image data (of the above scaled-down frame c) form the top-most row of pixel blocks (i.e., n(1,1), n(1,3), . . . , n(1,39)) in the reference plane as shown in FIGS. 5B and 5C. Then, based on the vertical shift spacing Hs=4, by skipping the top mirrored region (two-row pixels) and the topmost two-row pixels (p(i, j), i=0,1) of the original image data, the following eight-row pixels (p(i, j), i=2-9) of the original image data form the top-most row of pixel blocks (i.e., n(2,1), n(2,3), . . . , n(2,39)) in the bottom plane. Next, by skipping the following four-row pixels (p(i, j), i=2-5) of the original image data, the following eight-row pixels (p(i, j), i=6-13) of the original image data form the second top-most row of pixel blocks (i.e., n(3,1), n(3,3), . . . , n(3,39)) in the reference plane. In this manner, by repeating skipping four-row pixels (the vertical shift spacing Hs=4) in y-axis each time, the reference plane and the bottom plane are constructed vertically. Symmetrically, the bottom mirrored region and the bottom-most six-row pixels of the original image data (of the above scaled-down frame c) form the bottom-most row of pixel blocks (i.e., n(24,1), n(24,3), . . . , n(24,39)) in the bottom plane. Likewise, the vertical formation of the right plane and the right-bottom plane is similar to the vertical formation of the reference plane and the bottom plane. The operations in following steps (132-133) are the same as those described above. In step 134, post-processing is not followed by an interpolation operation because the depth map c_map already has 40×24 post-processed depth values.

Comparing FIGS. 3 and 5A, the higher the complexity resolution, the more the scale factors Wdn and Hn and the more the number of pixel blocks n(y, x) to be outputted in step 131. Please note that the number of pixel blocks n(y, x) to be outputted in step 131 and the complexity resolution are only utilized as embodiments and not limitations of the invention. In practice, the scale factors Wdn and Hn may be different and not limited to even numbers.

In the following, luminance variation analysis is described. The above frame c having a display resolution of W×H pixels is received to compute first derivatives of luminance values with respect to x and/or y in step 121. For purposes of clarity and ease of description, only the first derivatives of luminance values with respect to x are described hereinafter.

Figure 6:
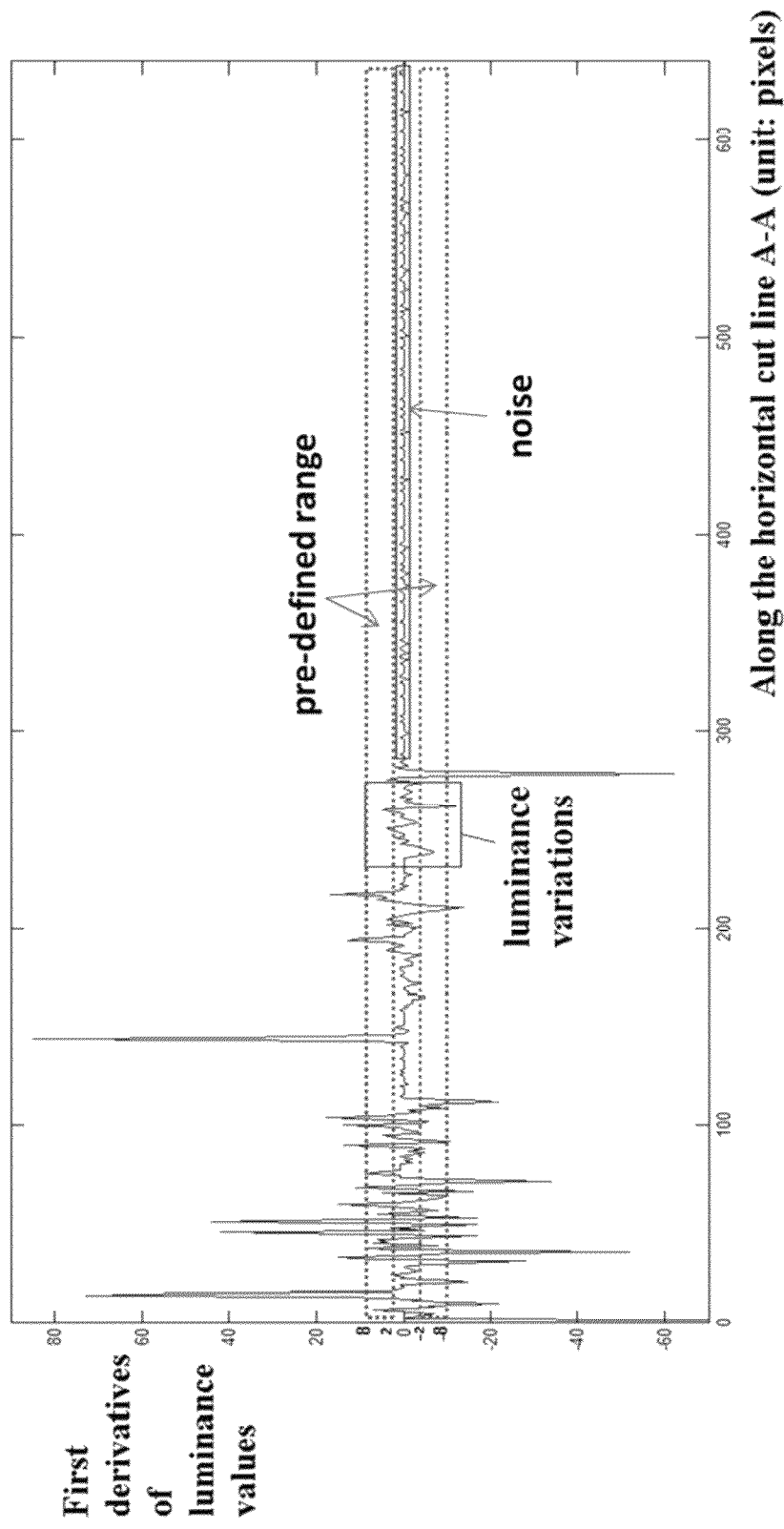
FIG. 6 shows the first derivatives of the luminance values of the pixels along the horizontal cut line A-A of FIG. 4A.

Another feature of the invention is to perform a differential calculation to obtain the luminance variations of near objects or persons in an image. An image characteristic of the luminance variations is that the luminance values of pixels associated with the near objects or persons are "appropriately and continuously" varied. Accordingly, the invention imposes an upper limit (th1) and a lower limit (th2) on the number Np of the pixels whose first derivatives fd of the luminance values continuously stay within a pre-defined range, i.e. v2≤|fd|≤v1 and th2≤Np≤th1. In case the number Np is less than th2, it indicates that there may be noise or specific texture patterns in the image. In case the number Np is greater than th1, it indicates that there may be image gradients or backgrounds (i.e., the luminance variations of distant objects). According to the invention, the more the luminance values contained in an accumulation block Z(y,x) (its definition will be described below), the nearer the accumulation block Z(y,x) is to a viewer. FIG. 6 shows the first derivatives of the luminance values of the pixels along the horizontal cut line A-A of FIG. 4A. In the embodiment of FIG. 6, v1=8 and v2=2.

FIG. 7 shows a relation of an exemplary pixel line and its first derivatives. In step 121, compute the first derivatives of luminance values with respect to x for all pixels of the above frame c. In step 122, the above frame c of W×H pixels is divided into a plurality of accumulation blocks Z(y,x), where Z(y,x) denotes a matrix. Assume W=1920, H=1080, th1=30, th2=4, v1=8 and v2=2 in one embodiment. In this embodiment, in step 122, for normalization purpose, the above frame c of 1920×1080 pixels is firstly divided into a total of 40×24 accumulation blocks Z(y,x), where Z(y,x) denotes a 48×45 matrix, x=1-40 and y=1-24. Next, from left to right, check pixel by pixel whether the first derivative fd of the luminance value is in the pre-defined range along each pixel line; meanwhile, accumulate the number Np of the pixels with respect to x for all pixel lines in each accumulation block Z(y,x). Assume the image strip of FIG. 7 is portion of pixel line $L_1$ in accumulation block Z(1,1) (not shown). From left to right, one will find the numbers Np1 and Np2 greater than 4 and then accumulate Np1 and Np2. In this manner, checking and accumulating the number Np repeat until the last pixel line $L_{48}$ in accumulation block Z(1,1) is done to obtain the sum SNp(1,1). The sum SNp(1,1) of accumulation block Z(1,1) will be temporarily stored in a separate buffer 2. Likewise, the sums SNp(y,x) of all accumulation blocks Z(y,x) are respectively computed and stored in buffer 2. The depth value for each accumulation block Z(y,x) is calculated as follows: d(y, x)=SNp(y,x)×wf, and 0<=d(y,x)<=255. The parameter wf is a weighting factor. Like step 106, a total of 40×24 depth values d(y,x) are post-processed in step 123 to produce a luminance-variation depth map i_map including more spatially consistent depth values. The luminance-variation depth map i_map is also saved in buffer 2.

In an alternative embodiment, the first derivatives of luminance values with respect to y are computed in step 121. Next, from top to bottom, check pixel by pixel whether the first derivative of the luminance value is in the pre-defined range along each pixel column in each accumulation block Z(y,x) in step 122. Then, the numbers Np of the pixels with respect to y for all pixel columns in each accumulation block Z(y,x) are accumulated to obtain the corresponding sum SNp(y,x). In another alternative embodiment, the first derivatives of luminance values with respect to x and y are computed in step 121. Correspondingly, in step 122, perform the above checking and accumulation in X direction and then in Y direction to obtain the sum SNp(y,x) for each accumulation block Z(y,x) and vice versa. The following steps are similar to those described above and therefore the detailed description is omitted for the sake of brevity.

Please be noted the motion analysis and the static analysis are performed by means of luminance data of pixels without using color (including hue and saturation) information of pixels. Therefore, data storage are reduced.

Returning to FIG. 1A, as indicated above, all the depth maps (m_map, c_map, i_map) sent to step 107 are already normalized to the same reference (i.e., 40×24 in this embodiment). According to the invention, a static analysis includes the complexity analysis and the luminance variation analysis. In step 107, the depth fusion is also performed in buffer 2. The depth maps (c_map and i_map) of the complexity analysis and the luminance variation analysis are fused to obtain a static depth map according to weighting factors w1-w2 as follows: sd_map(y,x)=w1×c_map(y,x)+w2×i_map(y,x), where the weighting factors w1-w2 are adjustable. Then, according to a F-S line (a linear equation of fd_map and sd_map) below, a fused depth map fd_map is calculated as follows:

$$fd\_map(y,x)=((((255-w3\times m\_map(y,x))\times sd\_map(y,x)))/255)+w3\times m\_map(y,x),\text{ where the weighting factor }w3\text{ is adjustable.}$$

Figure 8A:
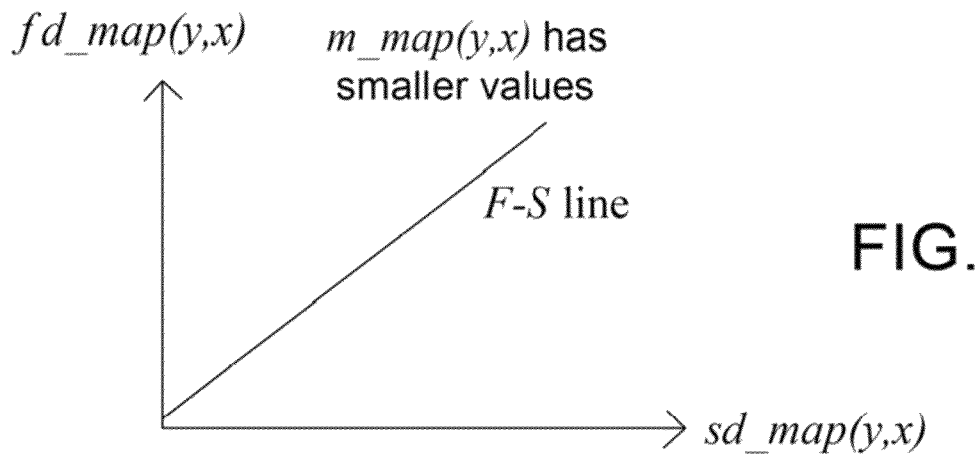
FIGS. 8A-8C show the relationship of m_map(y,x), sd_map(y,x) and fd_map(y,x).
Figure 8B:
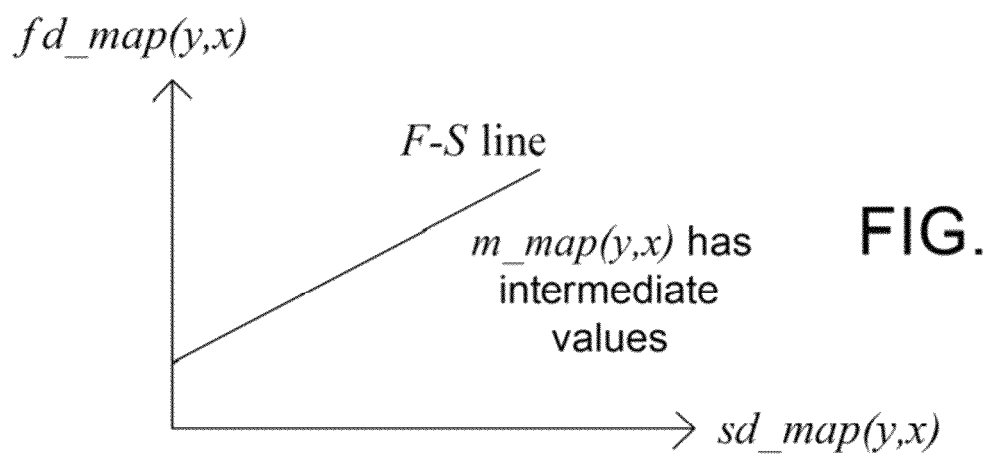
Figure 8C:
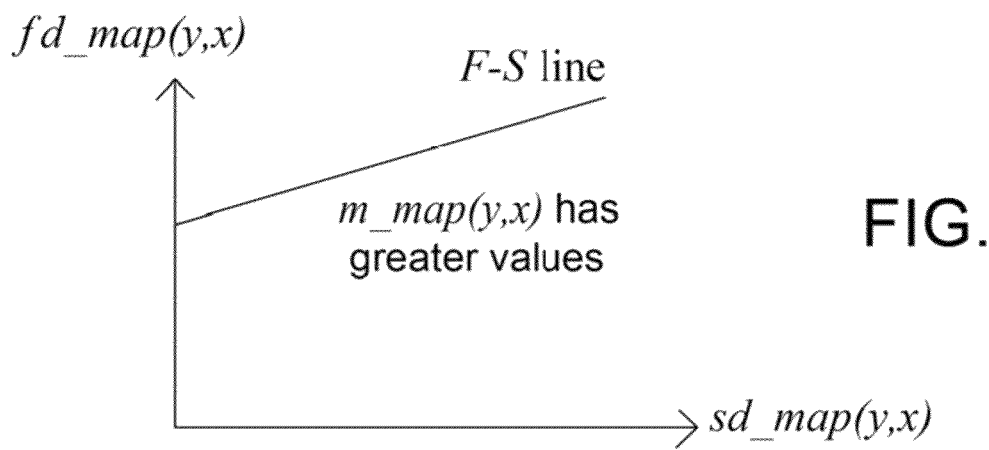

FIGS. 8A-8C show the relationship of m_map(y,x), sd_map(y,x) and fd_map(y,x). As can be observed from FIGS. 8A-8C, the motion depth map m_map determines the slope and the y-intercept (or fd_map-intercept) of the F-S line. The greater the values of m_map(y,x), the greater the y-intercept and the less the slope. Please be noted that when the motion depth map, the complexity depth map and the luminance-variation depth map are fused in step 107, the best image quality is achieved. The invention (including the F-S line) still works if only two out of the three depth maps are fused. For example, if the motion analysis is excluded, the static depth map is directly used as the fused depth map. If the complexity analysis is excluded, the luminance-variation depth map is directly used as the static depth map.

Next, a temporal modulation is performed in step 108. Compared to the post processing in steps 106, 123 and 134 that ensures spatially consistent depth values, the temporal modulation ensures that depth values are temporally consistent. In one embodiment, a temporal modulation is performed on the fused depth map fd_map(y,x) of the current frame c and temporal modulation depth maps (tm_map$_{c-1}$(y,x) and tm_map$_{c-2}$(y,x)) of the immediately previous two frames (c−1 and c−2) by means of a temporal filter in step 108. In an alternative embodiment, according to the temporal modulation depth maps (tm_map$_{c-1}$(y,x) and tm_map$_{c-2}$(y,x)) of the immediately previous two frames (c−1 and c−2) and the fused depth map (fd_map(y,x)) of the current frame c, a temporal modulation depth map (tm_map$_c$(y,x)) of current frame c is calculated as follows in step 108:

$$tm\_map_c(y,x) = tm\_map_{c-1}(y,x) + \gamma \times \text{length};$$

$$\text{length} = \min[\text{abs}((fd\_map(y,x) - tm\_map_{c-1}(y,x)) - (tm\_map_{c-1}(y,x) - tm\_map_{c-2}(y,x))), lth];$$

$$\gamma = 1 - abs\left[\frac{(tm\_map)_{c-1}(y,x)-(tm\_map)_{c-2}(y,x)}{lth}\right];$$

Here, the parameter lth is a pre-set constant.

Figure 9:
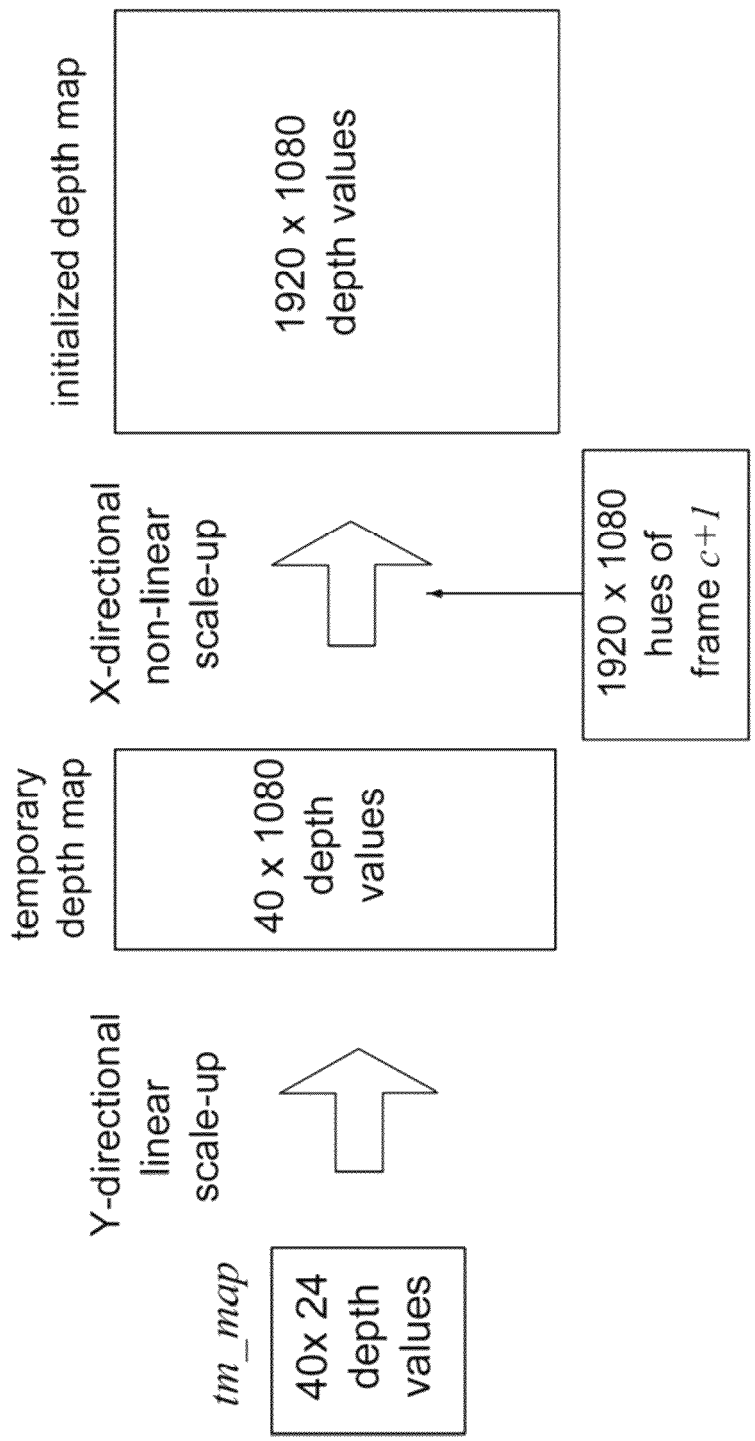
FIG. 9 is a diagram showing a flow of directional scale up according to an embodiment of the invention.

Next, the temporal modulation depth map tm_map$_c$(y,x) (40×24) is scaled up in a non-linear manner to obtain an initialized depth map of 1920×1080 depth values according to the HSL (short for hue, saturation and luminance) information of the next frame (c+1) in step 109. However, performing a directional non-linear scale-up is storage-space-consuming. In one embodiment, in order to save storage space, a y-directional linear scale-up is performed and then an x-directional non-linear scale-up is performed as shown in FIG. 9. Specifically, each column of the 24 depth values of the temporary modulation depth map tm_map$_c$ is scaled up to 1080 depth values by means of linear interpolation (y-directional linear scale-up) to obtain a temporary depth map. Afterward, the temporary depth map (having 40×1080 depth values) is scaled up in x-direction to obtain an initialized depth map of 1920×1080 depth values in a non-linear manner according to the HSL information of the next frame (c+1) (x-directional non-linear scale-up). Linear interpolation is well known in the art and thus the detailed description is omitted herein. With respect to x-directional nonlinear scale-up, each row of 40 depth values of the temporary depth map is scaled up to 1920 depth values according to the HSL information of the next frame (c+1). In other words, 47 depth values have to be interpolated in a non-linear manner for each pair of neighboring depth values in the x-direction of the temporary depth map. The HSL information of the next frame (c+1) allows detailed comparisons during the process of non-linear scale-up. Specifically, the saturation information of the next frame (c+1) helps distinguish shallow colors and deep colors and the luminance information of the next frame (c+1) helps distinguish colors between black and white.

Figure 10:
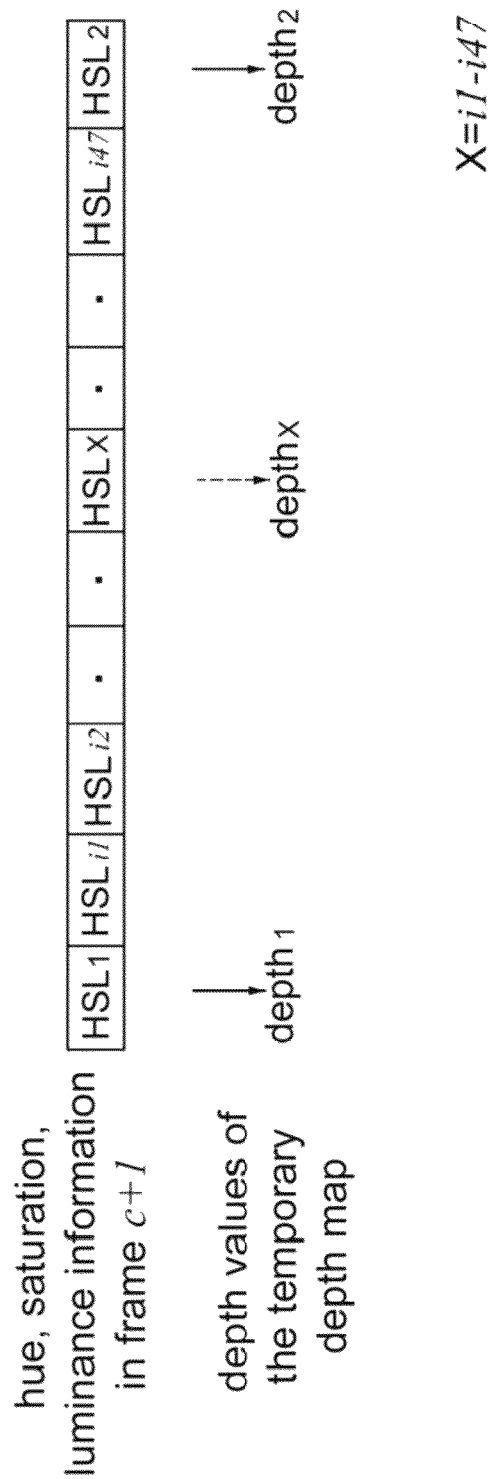
FIG. 10 shows an exemplary pair of neighboring depth values in a row of a temporary depth map and their corresponding HSL (short for hue, saturation and luminance) information at respective locations of the next frame (c+1).

FIG. 10 shows an exemplary pair of neighboring depth values in a row of the temporary depth map and their corresponding HSL information at respective locations of the next frame (c+1). In FIG. 10, assume that the pair of neighboring depth values in the x-direction of the temporary depth map is depth$_1$ and depth$_2$. Each of the intermediate depth values depth$_x$ (x=i1-i47) between depth$_1$ and depth$_2$ is calculated as follows.

$$\Delta H_1=\min[\text{abs}(h_1-h_x),\{([(1-\max[h_1,h_x])+\min[h_1,h_x]])\}];$$

/* $h_x$, $h_1$ and $h_2$ respectively denote the hue information of HSL$_x$, HSL$_1$ and HSL$_2$ */

$$\Delta H_2=\min[\text{abs}(h_2-h_x),\{([(1-\max[h_2,h_x])+\min[h_2,h_x]])\}];$$

/* $\Delta H_1$ denotes a hue absolute difference between neighboring locations 1 and x and $\Delta H_2$ denotes a hue absolute difference between neighboring locations x and 2 */

$$\Delta S_1=\text{abs}(s_1-s_x);$$

/* $S_x$, $S_1$ and $S_2$ respectively denote the saturation information of HSL$_x$, HSL$_1$, and HSL$_2$ */

$$\Delta S_2=\text{abs}(s_2-s_x);$$

/* $\Delta S_1$ denotes a saturation absolute difference between neighboring locations 1 and x and $\Delta S_2$ denotes a absolute saturation difference between neighboring locations x and 2 */

$$\Delta L_1=\text{abs}(l_1-l_x);$$

/* $l_x$, $l_1$ and $l_2$ respectively denote the luminance information of HSL$_x$, HSL$_1$ and HSL$_2$ */

$$\Delta L_2=\text{abs}(l_2-l_x);$$

/* $\Delta L_1$ denotes a luminance absolute difference between neighboring locations 1 and x and $\Delta L_2$ denotes a luminance absolute difference between neighboring locations x and 2 */

$$\Delta D_1=ph\cdot\Delta H_1+ps\cdot\Delta S_1+pl\cdot\Delta L_1;$$

/* related to HSL$_1$ and HSL$_x$ */

$$\Delta D_2=ph\cdot\Delta H_2+ps\cdot\Delta S_2+pl\cdot\Delta L_2;$$

/* related to HSL$_x$ and HSL$_2$ */

$$\text{depth}_x=a\ \%\times\text{depth}_1+b\ \%\times\text{depth}_2;$$

Here, a+b=100. The weighting factors (ph, ps, pl) satisfy the following relation: ph>ps>>pl. The absolute difference values $\Delta D_1$ and $\Delta D_2$ are compared. If $\Delta D_1 \leq \Delta D_2$, it indicates the HSL information between HSL$_1$ and HSL$_x$ are closer than that of HSL$_x$ and HSL$_2$ and thus the value a will be chosen to be greater than the value b. Contrarily, if $\Delta D_1 > \Delta D_2$, it indicates the HSL information of HSL$_x$ and HSL$_2$ are closer than that of HSL$_1$ and HSL$_x$ and thus the value a will be chosen to be less than the value b. The weight values a and b are adjustable and respectively depend on the absolute difference values $\Delta D_1$ and $\Delta D_2$. In the same manner, all the intermediate depth values depth$_x$ (x=i1-i47) are calculated and therefore the initialized depth map is obtained. However, this is regarded as an embodiment and not a limitation of the invention. In the actual implementations, the above non-linear scale-up can be performed in at least one of x-direction and y-direction and this also falls in the scope of the present invention.

Finally, a bilateral filtering is performed on the initialized depth map by means of a bilateral filter to diminish block effect in step 110 and generate a final depth map.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A method comprising:
    scaling down a video unit c and a previous video unit c−1 to generate a reduced video unit c and a reduced previous video unit c−1;
    dividing the reduced video unit c into N1 portions and a buffer into N2 storing units respectively;
    performing a motion estimation for a target pixel of the reduced video unit c to obtain a motion vector based on pixels in a preset search window established in the reduced previous video unit c−1;
    assigning a first depth value to the target pixel according to the motion vector;
    storing the target pixel in one of the N2 storing units, wherein the rest of the N2 storing units store at least one portion of the reduced previous video unit c−1; and
    repeating the steps of performing, assigning and storing until all pixels of the reduced video unit c are processed to obtain a motion depth map m_map;
    wherein N1 is less than N2.

2. The method according to claim 1, wherein a storage size of each of the N2 storing units is greater than or equal to a size of each of the N1 portions.

3. The method according to claim 1, wherein the target pixel and a center of the preset search window have the same coordinate.

4. The method according to claim 1, wherein a size of the preset search window is $((2\times m)-1)\times((2\times m)-1)$, where m denotes a height of each of the N1 portions.

5. The method according to claim 1, further comprising:
    storing the reduced previous video unit c−1 in the rest of the N2 storing units before the step of performing the motion estimation;
    wherein the reduced previous video unit c−1 is divided into N1 portions.

6. The method according to claim 1, further comprising:
    when a complexity resolution is the lowest, dividing the reduced video unit c into a first number of pixel blocks according to a number of points to be transformed in one pixel block;
    when the complexity resolution is other than the lowest, forming a second number of pixel blocks according to both luminance data and a size of the reduced video unit c, the number of points to be transformed and a size of the second number of pixel blocks;
    sequentially transforming the pixel blocks into a plurality of frequency blocks;
    multiplying each of the frequency blocks by a weight matrix to obtain a product matrix, wherein a plurality of elements in the weight matrix corresponding to mediate-high-frequency components are given more weights than the other elements; and
    obtaining a second depth value according to each of the product matrix to generate a complexity depth map;
    wherein the first number is less than the second number; and
    wherein the second number increases as the complexity resolution gets higher.

7. The method according to claim 6, wherein the step of forming the second number of pixel blocks comprises:
    calculating a shift spacing in a first direction according to a first-direction size of the reduced video unit c and a first-direction size of the second number of pixel blocks;
    calculating a scale factor by which the first number of pixel blocks are enlarged in the first direction according to the number of points to be transformed, the first-direction size of the reduced video unit c and the first-direction size of the second number of pixel blocks;
    calculating a number of mirrored pixels arranged in the first direction in each of two mirrored regions formed in a second direction according to the shift spacing and the scale factor; and
    forming the second number of pixel blocks in the first direction according to the number of mirrored pixels, the shift spacing, the scale factor and image data of the reduced video unit c;
    wherein the first direction is perpendicular to the second direction.

8. The method according to claim 7, further comprising:
    dividing the video unit c into a plurality of accumulation blocks;
    computing first derivatives fd of luminance values with respect to a third direction for all pixels in the video unit c;
    along the third direction, accumulating a number Np of the pixels whose first derivatives fd continuously stay in a pre-defined range to obtain a sum for each accumulation block, wherein $th2 \leq Np \leq th1$; and
    obtaining a luminance-variation depth map according to the sum for each accumulation block;
    wherein the third direction is at least one of x-direction and y-direction.

9. The method according to claim 8, further comprising:
    fusing the complexity depth map and the luminance-variation depth map to generate a static depth map sd_map;
    fusing the motion depth map m_map and the static depth map sd_map to generate a fused depth map fd_map, wherein fd_map increases as sd_map increases and m_map determines a fd_map-intercept and a slope of a linear equation of sd_map and fd_map;
    obtaining a temporal modulation depth map $tm\_map_c$ of the video unit c according to the fused depth map fd_map and two temporal modulation depth maps ($tm\_map_{c-1}$, and $tm\_map_{c-2}$) of two immediately previous video units c−1 and c−2; and
    performing a nonlinear scale up along a fourth direction according to hue, saturation and luminance (HSL) information of a next video unit c+1 and the temporal modulation depth map $tm\_map_c$;
    wherein the fourth direction is at least one of x-direction and y-direction.

10. The method according to claim 9, wherein the linear equation is given by:

$$fd\_map(y,x)=((((255-w3\times m\_map(y,x))\times sd\_map(y,x)))/255)+w3\times m\_map(y,x);$$

wherein y is a row index and x is a column index;
wherein w3 is adjustable;

wherein the temporal modulation depth map tm_map$_c$ is given by the following equations:

$$\text{tm\_map}_c(y, x) = \text{tm\_map}_{c-1}(y, x) + \gamma \times \text{length};$$

$$\text{length} = \min[\text{abs}((\text{fd\_map}(y, x) - \text{tm\_map}_{c-1}(y, x)) -$$
$$(\text{tm\_map}_{c-1}(y, x) - \text{tm\_map}_{c-2}(y, x))), lth];$$

and $$\gamma = 1 - {}^{abs}\left[\frac{(\text{tm\_map})_{c-1}(y,x) - (\text{tm\_map})_{c-2}(y,x)}{lth}\right];$$

wherein lth is a constant; and
wherein y is a row index and x is a column index.

11. The method according to claim 9, wherein the step of performing the nonlinear scale up comprising:
selecting two neighboring pixels in the fourth direction of the temporary depth map tm_map$_c$;
obtaining corresponding HSL information of the two neighboring pixels and an intermediate pixel according to the HSL information of the next video unit c+1;
comparing a first absolute HSL difference between the intermediate pixel and one of the two neighboring pixels and a second absolute HSL difference between the intermediate pixel and the other of the two neighboring pixels;
calculating a depth value of the intermediate pixel according to the first absolute HSL difference, the second absolute HSL difference and the depth values of the two neighboring pixels; and
repeating the steps of selecting, obtaining, comparing and calculating until all intermediate pixels are processed;
wherein the first absolute HSL difference is given by:

$$\Delta D_1 = ph \cdot \Delta H_1 + ps \cdot \Delta S_1 + pl \cdot \Delta L_1;$$

wherein the second absolute HSL difference is given by:

$$\Delta D_2 = ph \cdot \Delta H_2 + ps \cdot \Delta S_2 + pl \cdot \Delta L_2;$$

wherein $$\Delta H_1 = \min[\text{abs}(h_1 - h_x), \{([(1 - \max[h_1, h_x]) + \min[h_1, h_x]])\}];$$

$$\Delta H_2 = \min[\text{abs}(h_2 - h_x), \{([(1 - \max[h_2, h_x]) + \min[h_2, h_x]])\}];$$

$$\Delta S_1 = \text{abs}(s_1 - s_x);$$

$$\Delta S_2 = \text{abs}(s_2 - s_x);$$

$$\Delta L_1 = \text{abs}(l_1 - l_x); \text{ and}$$

$$\Delta L_2 = \text{abs}(l_2 - l_x);$$

wherein h$_x$, h$_1$ and h$_2$ respectively denote the hue information of the intermediate pixel and the two neighboring pixels;
wherein S$_x$, S$_1$ and S$_2$ respectively denote the saturation information of the intermediate pixel and the two neighboring pixels; and
wherein l$_x$, l$_1$ and l$_2$ respectively denote the luminance information of the intermediate pixel and the two neighboring pixels.

12. A device comprising:
means for scaling down a video unit c and a previous video unit c−1 to generate a reduced video unit c and a reduced previous video unit c−1;
means for dividing the reduced video unit c into N1 portions and a buffer into N2 storing units respectively;
means for performing a motion estimation for a target pixel of the reduced video unit c to obtain a motion vector based on pixels in a preset search window established in the reduced previous video unit c−1;
means for assigning a first depth value to the target pixel according to the motion vector;
means for storing the target pixel in one of the N2 storing units, wherein the rest of the N2 storing units store at least one portion of the reduced previous video unit c−1; and
means for repeating the steps of performing, assigning and storing until all pixels of the reduced video unit c are processed to obtain a motion depth map m_map;
wherein N1 is less than N2.

13. The device according to claim 12, wherein a storage size of each of the N2 storing units is greater than or equal to a size of each of the N1 portions.

14. The device according to claim 12, wherein the target pixel and a center of the preset search window have the same coordinate and wherein the reduced previous video unit c−1 is divided into N1 portions.

15. The device according to claim 12, wherein a size of the preset search window is ((2×m)−1)×((2×m)−1), where m denotes a height of each of the N1 portions.

16. The device according to claim 12, further comprising:
means for dividing the reduced video unit c into a first number of pixel blocks according to a number of points to be transformed in one pixel block when a complexity resolution is the lowest;
means for forming a second number of pixel blocks according to both luminance data and a size of the reduced video unit c, the number of points to be transformed and a size of the second number of pixel blocks when the complexity resolution is other than the lowest;
means for sequentially transforming the pixel blocks into a plurality of frequency blocks;
means for multiplying each of the frequency blocks by a weight matrix to obtain a product matrix, wherein a plurality of elements in the weight matrix corresponding to mediate-high-frequency components are given more weights than the other elements; and
means for obtaining a second depth value according to each of the product matrix to generate a complexity depth map;
wherein the first number is less than the second number.

17. A method comprising:
scaling down a video unit c to generate a reduced video unit c;
when a complexity resolution is the lowest, dividing the reduced video unit c into a first number of pixel blocks according to a number of points to be transformed in one pixel block;
when the complexity resolution is other than the lowest, forming a second number of pixel blocks according to both image data and a size of the reduced video unit c, the number of points to be transformed and a size of the second number of pixel blocks;
sequentially transforming the pixel blocks into a plurality of frequency blocks;
multiplying each of the frequency blocks by a weight matrix to obtain a product matrix, wherein a plurality of elements in the weight matrix corresponding to mediate-high-frequency components are given more weights than the other elements; and obtaining a depth value according to each of the product matrix to generate a complexity depth map;

wherein the first number is less than the second number; and wherein the second number increases as the complexity resolution gets higher.

18. The method according to claim 17, wherein the step of forming comprises:

calculating a shift spacing in a first direction according to a first-direction size of the reduced video unit c and a first-direction size of the second number of pixel blocks;

calculating a scale factor by which the first number of pixel blocks are enlarged in the first direction according to the number of points to be transformed, the first-direction size of the reduced video unit c and the first-direction size of the second number of pixel blocks;

calculating a number of mirrored pixels arranged in the first direction in each of two mirrored regions formed in a second direction according to the shift spacing and the scale factor; and forming the second number of pixel blocks in the first direction according to the number of mirrored pixels, the shift spacing, the scale factor and image data of the reduced video unit c;

wherein the first direction is perpendicular to the second direction.

19. The method according to claim 17, wherein the step of obtaining the depth value comprises:

adding all elements up for each product matrix to obtain a first sum; and dividing the first sum by a pre-defined factor to obtain the depth value;

wherein the pre-defined factor is related to the first sum multiplied by a ratio.

20. The method according to claim 17, wherein an element in the weight matrix corresponding to a DC component is set to zero.

21. The method according to claim 17, further comprising:

dividing the video unit c into a plurality of accumulation blocks;

computing first derivatives fd of luminance values with respect to a third direction for all pixels in the video unit c;

along the third direction, accumulating a number Np of the pixels whose first derivatives fd continuously stay in a pre-defined range to obtain a second sum for each accumulation block, wherein $th2 \leq Np \leq th1$; and obtaining a luminance-variation depth map according to the second sum for each accumulation block;

wherein the third direction is at least one of x-direction and y-direction.

22. The method according to claim 21, wherein the step of accumulating comprises:

when the third direction is x-direction, accumulating the number Np of the pixels whose first derivatives fd continuously stay in the pre-defined range for all pixel lines in each accumulation block to obtain the first sum; and when the third direction is y-direction, accumulating the number Np of the pixels whose first derivatives fd continuously stay in the pre-defined range for all pixel columns in each accumulation block to obtain the first sum.

23. The method according to claim 21, further comprising:

fusing the complexity depth map and the luminance-variation depth map to generate a fused depth map fd_map;

obtaining a temporal modulation depth map tm_map$_c$ of the video unit c according to the fused depth map fd_map and two temporal modulation depth maps (tm_map$_{c-1}$ and tm_map$_{c-2}$) of two immediately previous video units c−1 and c−2; and performing a nonlinear scale up along a fourth direction according to hue, saturation and luminance (HSL) information of a next video unit c+1 and the temporal modulation depth map tm_map$_c$;

wherein the fourth direction is at least one of x-direction and y-direction.

24. The method according to claim 23, wherein the temporal modulation depth map tm_map$_c$ is given by the following equations:

$$tm\_map_c(y, x) = tm\_map_{c-1}(y, x) + \gamma \times length;$$

$$length = \min[abs((fd\_map(y, x) - tm\_map_{c-1}(y, x)) - (tm\_map_{c-1}(y, x) - tm\_map_{c-2}(y, x))), lth];$$

and $$\gamma = 1 - abs\left[\frac{tm\_map_{c-1}(y, x) - tm\_map_{c-2}(y - x)}{lth}\right];$$

wherein lth is a constant; and wherein y is a row index and x is a column index.

25. The method according to claim 23, wherein the step of performing the nonlinear scale up comprising:

selecting two neighboring pixels in the fourth direction of the temporary depth map tm_map$_c$;

obtaining corresponding HSL information of the two neighboring pixels and an intermediate pixel according to the hues of the next video unit c+1;

comparing a first absolute HSL difference between the intermediate pixel and one of the two neighboring pixels and a second absolute HSL difference between the intermediate pixel and the other of the two neighboring pixels;

calculating a depth value of the intermediate pixel according to the first absolute HSL difference, the second absolute HSL difference and the depth values of the two neighboring pixels; and repeating the steps of selecting, obtaining, comparing and calculating until all intermediate pixels are processed;

wherein the first absolute HSL difference is given by:

$$\Delta D_1 = ph \cdot \Delta H_1 + ps \cdot \Delta S_1 + pl \cdot \Delta L_1;$$

wherein the second absolute HSL difference is given by:

$$\Delta D_2 = ph \cdot \Delta H_2 + ps \cdot \Delta S_2 + pl \cdot \Delta L_2;$$

wherein $$\Delta H_1 = \min[abs(h_1 - h_x), \{([(1 - \max[h_1, h_x]) + \min[h_1, h_x])\})];$$

$$\Delta H_2 = \min[abs(h_2 - h_x), \{([(1 - \max[h_2, h_x]) + \min[h_2, h_x])\})];$$

$$\Delta S_1 = abs(s_1 - s_x);$$

$$\Delta S_2 = abs(s_2 - s_x);$$

$$\Delta L_1 = abs(l_1 - l_x); \text{ and}$$

$$\Delta L_2 = abs(l_2 - l_x);$$

wherein $h_x$; $h_1$ and $h_2$ respectively denote the hue information of the intermediate pixel and the two neighboring pixels;

wherein $S_x$, $S_1$ and $S_2$ respectively denote the saturation information of the intermediate pixel and the two neighboring pixels; and wherein $l_x$, $l_1$ and $l_2$ respectively denote the luminance information of the intermediate pixel and the two neighboring pixels.

26. A device comprising:
means for scaling down a video unit c to generate a reduced video unit c;
means for dividing the reduced video unit c into a first number of pixel blocks according to a number of points to be transformed in one pixel block when a complexity resolution is the lowest;
means for forming a second number of pixel blocks according to image data of the reduced video unit c, the number of points to be transformed, a size of the reduced video unit c and a size of the second number of pixel blocks when the complexity resolution is other than the lowest;
means for sequentially transforming the pixel blocks into a plurality of frequency blocks;
means for multiplying each of the frequency blocks by a weight matrix to obtain a product matrix, wherein a plurality of elements in the weight matrix corresponding to mediate-high-frequency components are given more weights than the other elements; and
means for obtaining a depth value according to each of the product matrix to generate a complexity depth map;
wherein the first number is less than the second number; and
wherein the second number increases as the complexity resolution gets higher.

27. The device according to claim 26, wherein the means for forming comprises:
means for calculating a shift spacing in a first direction according to a first-direction size of the reduced video unit c and a first-direction size of the second number of pixel blocks;
means for calculating a scale factor by which the first number of pixel blocks are enlarged in the first direction according to the number of points to be transformed, the first-direction size of the reduced video unit c and the first-direction size of the second number of pixel blocks;
means for calculating a number of mirrored pixels arranged in the first direction in each of two mirrored regions formed in a second direction according to the shift spacing and the scale factor; and
means for forming the second number of pixel blocks in the first direction according to the number of mirrored pixels, the shift spacing, the scale factor and image data of the reduced video unit c;
wherein the first direction is perpendicular to the second direction.

28. The device according to claim 26, wherein the means for obtaining the depth value comprises:
means for adding all elements up for each product matrix to obtain a first sum; and
means for dividing the first sum by a pre-defined factor to obtain the depth value;
wherein the pre-defined factor is related to the first sum multiplied by a ratio.

29. The device according to claim 26, wherein an element in the weight matrix corresponding to a DC component is set to zero.

30. The device according to claim 26, further comprising:
means for dividing the video unit c into a plurality of accumulation blocks;

means for computing first derivatives fd of luminance values with respect to a third direction for all pixels in the video unit c;
means for accumulating a number Np of the pixels whose first derivatives fd continuously stay in a pre-defined range to obtain a second sum for each accumulation block along the third direction, wherein th2≤Np≤th1; and
means for obtaining a luminance-variation depth map according to the second sum for each accumulation block.

31. A method comprising:
dividing a video unit c into a plurality of accumulation blocks;
computing first derivatives fd of luminance values with respect to a first direction for all pixels in the video unit c;
along the first direction, accumulating a number Np of the pixels whose first derivatives fd continuously stay in a pre-defined range to obtain a sum for each accumulation block, wherein th2≤Np≤th1; and
obtaining a luminance-variation depth map according to the sum for each accumulation block;
wherein the first direction is at least one of x-direction and y-direction.

32. The method according to claim 31, wherein the step of obtaining the luminance-variation depth map comprises:
obtaining the luminance-variation depth map by multiplying the sum by a weighting factor for each block.

33. The method according to claim 31, wherein the step of accumulating comprises:
when the first direction is x-direction, accumulating the number Np of the pixels whose first derivatives fd continuously stay in the pre-defined range for all pixel lines in each accumulation block to obtain the sum; and
when the first direction is y-direction, accumulating the number Np of the pixels whose first derivatives fd continuously stay in the pre-defined range for all pixel columns in each accumulation block to obtain the sum.

34. The method according to claim 31, wherein when the first direction comprises x-direction and y-direction, the step of accumulating comprises:
along one of x-direction and y-direction, accumulating the number Np of the pixels whose first derivatives fd with respect to the one of x-direction and y-direction continuously stay in the pre-defined range; and
then, along the other direction, accumulating the number Np of the pixels whose first derivatives fd with respect to the other direction continuously stay in the pre-defined range to obtain the sum.

35. The method according to claim 31, wherein the pre-defined range is given by: v2≤|fd|v1, where v1 and v2 are adjustable.

36. The method according to claim 31, further comprising:
scaling down the video unit c and a previous video unit c−1 to generate a reduced video unit c and a reduced previous video unit c−1;
dividing the reduced video unit c into N1 portions and a buffer into N2 storing units respectively;
performing a motion estimation for a target pixel of the video unit c to obtain a motion vector based on pixels in a preset search window established in the reduced previous video unit c−1;
assigning a depth value to the target pixel according to the motion vector;

storing the target pixel in one of the N2 storing units, wherein the rest of the N2 storing units store at least one portion of the reduced previous video unit c−1; and repeating the steps of performing, assigning and storing until all pixels of the reduced video unit c are processed to obtain a motion depth map m_map for the video unit c;

wherein N1 is less than N2.

37. The method according to claim 36, wherein the target pixel and a center of the preset search window have the same coordinate.

38. The method according to claim 36, further comprising:
fusing the motion depth map m_map and the luminance-variation depth map i_map to generate a fused depth map fd_map, wherein fd_map increases as i_map increases and m_map determines a fd_map-intercept and a slope of a linear equation of i_map and fd_map;

obtaining a temporal modulation depth map tm_map$_c$ of the video unit c according to the fused depth map fd_map and two temporal modulation depth maps (tm_map$_{c-1}$ and tm_map$_{c-2}$) of two immediately previous video units c−1 and c−2; and performing a nonlinear scale up along a second direction to obtain an initialized depth map according to hue, saturation and luminance (HSL) information of a next video unit c+1 and the temporal modulation depth map tm_map$_c$;

wherein the second direction is at least one of x-direction and y-direction.

39. The method according to claim 38, wherein the linear equation is given by:

$$fd\_map(y,x) = ((((255 - w3 \times m\_map(y,x)) \times i\_map(y,x)))/255) + w3 \times m\_map(y,x);$$

wherein y is a row index and x is a column index;
wherein w3 is adjustable;
wherein the temporal modulation depth map tm_map$_c$ is given by the following equations:

$$tm\_map_c(y, x) = tm\_map_{c-1}(y, x) + \gamma \times length;$$

$$length = \min[abs((fd\_map(y, x) - tm\_map_{c-1}(y, x)) - (tm\_map_{c-1}(y, x) - tm\_map_{c-2}(y, x))), lth];$$

and $$\gamma = 1 - abs\left[\frac{tm\_map_{c-1}(y, x) - tm\_map_{c-2}(y - x)}{lth}\right];$$

wherein lth is a constant; and
wherein y is a row index and x is a column index.

40. The method according to claim 38, wherein the step of performing the nonlinear scale up comprising:
selecting two neighboring pixels in the second direction of the temporary depth map tm_map$_c$;
obtaining corresponding HSL information of the two neighboring pixels and an intermediate pixel according to the HSL information of the next video unit c+1;
comparing a first absolute HSL difference between the intermediate pixel and one of the two neighboring pixels and a second absolute HSL difference between the intermediate pixel and the other of the two neighboring pixels;
calculating a depth value of the intermediate pixel according to the first absolute HSL difference, the second absolute HSL difference and the depth values of the two neighboring pixels; and repeating the steps of selecting, obtaining, comparing and calculating until all intermediate pixels are processed;
wherein the first absolute HSL difference is given by:

$$\Delta D_1 = ph \cdot \Delta H_1 + ps \cdot \Delta S_1 + pl \cdot \Delta L_1;$$

wherein the second absolute HSL difference is given by:

$$\Delta D_2 = ph \cdot \Delta H_2 + ps \cdot \Delta S_2 + pl \cdot \Delta L_2;$$

wherein $$\Delta H_1 = \min[abs(h_1 - h_x), \{([(1 - \max[h_1, h_x]) + \min[h_1, h_x]])\}];$$

$$\Delta H_2 = \min[abs(h_2 - h_x), \{([(1 - \max[h_2, h_x]) + \min[h_2, h_x]])\}];$$

$$\Delta S_1 = abs(s_1 - s_x);$$

$$\Delta S_2 = abs(s_2 - s_x);$$

$$\Delta L_1 = abs(l_1 - l_x); \text{ and}$$

$$\Delta L_2 = abs(l_2 - l_x);$$

wherein h$_x$, h$_1$ and h$_2$ respectively denote the hue information of the intermediate pixel and the two neighboring pixels;
wherein S$_x$, S$_1$ and S$_2$ respectively denote the saturation information of the intermediate pixel and the two neighboring pixels; and
wherein l$_x$, l$_1$ and l$_2$ respectively denote the luminance information of the intermediate pixel and the two neighboring pixels.

41. A device comprising:
means for dividing a video unit c into a plurality of accumulation blocks;
means for computing first derivatives fd of luminance values with respect to a direction for all pixels in the video unit c;
means for accumulating a number Np of the pixels whose first derivatives fd continuously stay in a pre-defined range to obtain a sum for each accumulation block along the direction, wherein th2≤Np≤th1; and
means for obtaining a luminance-variation depth map according to the sum for each accumulation block;
wherein the direction is at least one of x-direction and y-direction.

42. The device according to claim 41, wherein the means for obtaining the luminance-variation depth map comprises:
means for obtaining the luminance-variation depth map by multiplying the sum by a weighting factor for each block.

43. The device according to claim 41, wherein the means for accumulating comprises:
means for accumulating the number Np of the pixels whose first derivatives fd continuously stay in the pre-defined range for all pixel lines in each accumulation block to obtain the first sum when the direction is x-direction; and
means for accumulating the number Np of the pixels whose first derivatives fd continuously stay in the pre-defined range for all pixel columns in each accumulation block to obtain the first sum when the direction is y-direction.

44. The device according to claim 41, wherein the pre-defined range is given by: v2≤|fd|≤v1, where v1 and v2 are adjustable.

45. The device according to claim 41, further comprising:
means for scaling down the video unit c and a previous video unit c−1 to generate a reduced video unit c and a reduced previous video unit c−1;

means for dividing the reduced video unit c into N1 portions and a buffer into N2 storing units respectively;

means for performing a motion estimation for a target pixel of the video unit c to obtain a motion vector based on pixels in a preset search window established in the reduced previous video unit c−1;

means for assigning a depth value to the target pixel according to the motion vector;

means for storing the target pixel in one of the N2 storing units, wherein the rest of the N2 storing units store at least one portion of the reduced previous video unit c−1; and means for repeating the steps of performing, assigning and storing until all pixels of the reduced video unit c are processed to obtain a motion depth map m_map for the video unit c;

wherein N1 is less than N2.

* * * * *